United States Patent
Park et al.

(10) Patent No.: US 12,517,281 B2
(45) Date of Patent: Jan. 6, 2026

(54) META-OPTICAL DEVICE AND ELECTRONIC DEVICE INCLUDING THE SAME

(71) Applicant: SAMSUNG ELECTRONICS CO., LTD., Suwon-si (KR)

(72) Inventors: Hyunsung Park, Suwon-si (KR); Seunghoon Han, Seoul (KR); Hyeonsoo Park, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 404 days.

(21) Appl. No.: 18/097,820

(22) Filed: Jan. 17, 2023

(65) Prior Publication Data
US 2023/0236339 A1 Jul. 27, 2023

(30) Foreign Application Priority Data
Jan. 24, 2022 (KR) .................. 10-2022-0010230

(51) Int. Cl.
*G02B 1/00* (2006.01)
*G02B 1/11* (2015.01)
(Continued)

(52) U.S. Cl.
CPC ............... *G02B 1/002* (2013.01); *G02B 1/11* (2013.01); *G02B 1/14* (2015.01); *G02B 27/42* (2013.01); *G02B 2207/101* (2013.01)

(58) Field of Classification Search
CPC . G02B 1/002; G02B 1/14; G02B 1/11; G02B 27/42; G02B 2207/101
See application file for complete search history.

(56) References Cited

U.S. PATENT DOCUMENTS 10,241,244 B2  3/2019 Miller et al.
2014/0374377 A1 12/2014 Schulz et al.
(Continued)

FOREIGN PATENT DOCUMENTS

CN        106158889 B    7/2019
KR    10-2021-0052177 A  5/2021
WO       2021/220089 A1  11/2021

OTHER PUBLICATIONS

Communication dated Jun. 26, 2023 issued by the European Patent Office in EP Patent Application No. 23152035.4.
(Continued)

*Primary Examiner* — Nathanael R Briggs
(74) *Attorney, Agent, or Firm* — Sughrue Mion, PLLC

(57) ABSTRACT

Provided is a meta-optical device including a substrate, a first meta-structure layer provided on the substrate, the first meta-structure layer including a first nanostructure having a sub-wavelength shape dimension and a first peripheral material provided adjacent to the first nanostructure, a second meta-structure layer provided on the first meta-structure layer, the second meta-structure layer including a second nanostructure having the sub-wavelength shape dimension and a second peripheral material provided adjacent to the second nanostructure, and a first functional layer provided between the first meta-structure layer and the second meta-structure layer, the first functional layer including a first-first layer having an etch rate that is lower than an etch rate of the second peripheral material, and a first-second layer having a refractive index that is different from a refractive index of the first-first layer.

17 Claims, 24 Drawing Sheets

(51) Int. Cl.
   *G02B 1/14*      (2015.01)
   *G02B 27/42*     (2006.01)

(56) References Cited

U.S. PATENT DOCUMENTS

| | | | |
|---|---|---|---|
| 2019/0056531 A1* | 2/2019 | Miller | G02B 27/44 |
| 2020/0098813 A1 | 3/2020 | Huang et al. | |
| 2020/0142113 A1* | 5/2020 | Frey | G02B 5/288 |
| 2021/0132256 A1 | 5/2021 | Park et al. | |
| 2022/0221741 A1 | 7/2022 | Park et al. | |

OTHER PUBLICATIONS

Communication dated Jun. 30, 2025, issued by the Korean Patent Office in Korean Application No. 10- 2022-0010230.

* cited by examiner

META-OPTICAL DEVICE AND ELECTRONIC DEVICE INCLUDING THE SAME

CROSS-REFERENCE TO RELATED APPLICATION

This application is based on and claims priority under 35 U.S.C. § 119 to Korean Patent Application No. 10-2022-0010230, filed on Jan. 24, 2022, in the Korean Intellectual Property Office, the disclosure of which is incorporated by reference herein in its entirety.

BACKGROUND

1. Field

Example embodiments relate to a meta-optical device and an electronic device including the meta-optical device.

2. Description of Related Art

Diffractive optical devices using a meta-structure may obtain various optical effects that cannot be obtained by known refractive devices and may implement thin optical systems, and thus, diffractive optical devices are attracting increasing interest in many fields.

The meta-structure has a nanostructure in which a dimension less than a wavelength of incident light is applied to a shape, a cycle, and so on, and the nanostructure is designed such that a phase delay profile set for each position is satisfied to obtain desired optical performance.

When the nanostructure designed as such is manufactured through a semiconductor process, steps of film formation, lithography, and etching are generally performed. When a diffractive optical device to be manufactured includes several layers, an etch stop layer is used to protect a lower layer supporting an etching target material in an etching process. The etch stop layer forms an interface of a different refractive index from an adjacent layer and partially reflects light. Although reflectance may be reduced by adjusting the refractive index of the etch stop layer, the types of materials that may be used are limited because the etch stop layer is set to have a material with an etch rate lower than an etch rate of the etching target material, and thus, it is difficult to reduce the reflectance.

SUMMARY

One or more example embodiments provide a meta-optical device that may reduce reflectance due to an etch stop layer.

Additional aspects will be set forth in part in the description which follows and, in part, will be apparent from the description, or may be learned by practice of example embodiments of the disclosure.

According to an aspect of an example embodiment, there is provided a meta-optical device including a substrate, a first meta-structure layer provided on the substrate, the first meta-structure layer including a first nanostructure having a sub-wavelength shape dimension and a first peripheral material provided adjacent to the first nanostructure, a second meta-structure layer provided on the first meta-structure layer, the second meta-structure layer including a second nanostructure having the sub-wavelength shape dimension and a second peripheral material provided adjacent to the second nanostructure, and a first functional layer provided between the first meta-structure layer and the second meta-structure layer, the first functional layer including a first-first layer with an etch rate, lower than an etch rate of the second peripheral material, and a first-second layer having a refractive index different from a refractive index of the first-first layer.

When an effective refractive index of the first meta-structure layer is n1 and an effective refractive index of the second meta-structure layer is n2, one of the refractive index of the first-first layer and the refractive index of the first-second layer may be greater than $(n1 \ast n2)^{1/2}$, and the other of the refractive index of the first-first layer and the refractive index of the first-second layer may be less than $(n1 \ast n2)^{1/2}$.

The first functional layer may further include a first-third layer having the same refractive index as the first-first layer and the same thickness as the first-first layer, and the first-second layer may be provided between the first-first layer and the first-third layer.

The meta-optical device may further include a second functional layer provided between the substrate and the first meta-structure layer, the second functional layer including a second-first layer with an etch rate lower than an etch rate of the first peripheral material, and a second-second layer having a refractive index different from a refractive index of the second-first layer.

When a refractive index of the substrate is ns and an effective refractive index of the first meta-structure layer is n1, one of the refractive index of the second-first layer and the refractive index of the second-second layer may be greater than $(ns \ast n1)^{1/2}$, and the other of the refractive index of the second-first layer and the refractive index of the second-second layer may be less than $(ns \ast n1)^{1/2}$.

The second functional layer may further include a second-third layer having the same refractive index as the second-first layer and the same thickness as the second-first layer, and the second-second layer may be provided between the second-first layer and the second-third layer.

The meta-optical device may further include an antireflective layer provided between the substrate and the first meta-structure layer and having an effective refractive index between a refractive index ns of the substrate and an effective refractive index of the first meta-structure layer.

The meta-optical device may further include an antireflective layer provided on the second meta-structure layer and having an effective refractive index between an effective refractive index of the second meta-structure layer and 1.

The second nanostructure may be provided as a hole adjacent to the second peripheral material.

The meta-optical device may further include a protective layer provided on the second meta-structure layer, wherein the antireflective layer is provided between the second meta-structure layer and the protective layer.

The hole forming the second nanostructure may extend through the antireflective layer to an interface with the protective layer.

The antireflective layer may include a layer formed of the same material as the protective layer and a layer formed of a material different from a material of the protective layer, and the layer formed of the material different from the material of the protective layer may be in contact with the protective layer.

The second peripheral material may include silicon nitride, and the first-first layer of the first functional layer may include hafnium oxide.

The first-second layer of the first functional layer may include silicon oxide.

A thickness of the first-first layer of the first functional layer may be greater than or equal to 3 nm and less than or equal to 100 nm.

When a central wavelength of an operating wavelength of the meta-optical device is λc, a total thickness of the first functional layer may be greater than or equal to λc/10 and less than or equal to 1nc.

According to another aspect of an example embodiment, there is provided a meta-optical device including a substrate, a meta-structure layer provided on the substrate, the meta-structure layer including a nanostructure having a sub-wavelength shape dimension and a peripheral material provided adjacent to the nanostructure, and a functional layer provided between the substrate and the meta-structure layer, the functional layer including a first layer with an etch rate lower than an etch rate of the peripheral material and a second layer having a refractive index different from a refractive index of the first layer.

When a refractive index of the substrate is ns and an effective refractive index of the meta-structure layer is n1, one of the refractive index of the first layer and the refractive index of the second layer may be greater than $(ns*n1)^{1/2}$, and the other of the refractive index of the first layer and the refractive index of the second layer may be less than $(ns*n1)^{1/2}$.

The functional layer may further include a third layer having the same refractive index as the first layer and having the same thickness as the first layer, and the second layer may be provided between the first layer and the third layer.

The meta-optical device may further include an antireflective layer provided on the meta-structure layer and having an effective refractive index between an effective refractive index of the meta-structure layer and 1.

The nanostructure may be provided as a hole adjacent to the peripheral material.

The meta-optical device may further include a protective layer provided on the meta-structure layer, wherein the antireflective layer is provided between the meta-structure layer and the protective layer.

The hole forming the nanostructure may extend through the antireflective layer to an interface with the protective layer.

The antireflective layer may include a layer formed of the same material as the protective layer and a layer formed of a material different from a material of the protective layer, and the layer formed of the material different from the material of the protective layer may be in contact with the protective layer.

According to another aspect of an example embodiment, there is provided an electronic device including a lens assembly including a meta-optical device including a substrate, a first meta-structure layer provided on the substrate, the first meta-structure layer including a first nanostructure having a sub-wavelength shape dimension and a first peripheral material provided adjacent to the first nanostructure, a second meta-structure layer provided on the first meta-structure layer, the second meta-structure layer including a second nanostructure having the sub-wavelength shape dimension and a second peripheral material provided adjacent to the second nanostructure, and a first functional layer provided between the first meta-structure layer and the second meta-structure layer, the first functional layer including a first layer with an etch rate, lower than an etch rate of the second peripheral material, and a second layer having a refractive index different from a refractive index of the first layer, and an image sensor configured to convert an optical image, formed by the lens assembly, into an electrical signal.

According to another aspect of an example embodiment, there is provided an electronic device including a light source configured to emit light to an object, a meta-optical device including a substrate, a first meta-structure layer provided on the substrate, the first meta-structure layer including a first nanostructure having a sub-wavelength shape dimension and a first peripheral material provided adjacent to the first nanostructure, a second meta-structure layer provided on the first meta-structure layer, the second meta-structure layer including a second nanostructure having the sub-wavelength shape dimension and a second peripheral material provided adjacent to the second nanostructure, and a first functional layer provided between the first meta-structure layer and the second meta-structure layer, the first functional layer including a first layer with an etch rate, lower than an etch rate of the second peripheral material, and a second layer having a refractive index different from a refractive index of the first layer, a photodetector configured to detect light reflected from the object, and a signal processor configured to process a signal of the photodetector.

The meta-optical device may be provided on one of an optical path between the light source and the object, and an optical path between the object and the photodetector.

According to another aspect of an example embodiment, there is provided a meta-optical device including a substrate, a first meta-structure layer provided on the substrate, the first meta-structure layer including a first nanostructure having a sub-wavelength shape dimension and a first peripheral material provided adjacent to the first nanostructure, a second meta-structure layer provided on the first meta-structure layer, the second meta-structure layer including a second nanostructure having the sub-wavelength shape dimension and a second peripheral material provided adjacent to the second nanostructure, a functional layer provided between the first meta-structure layer and the second meta-structure layer, the functional layer including a first layer with an etch rate, lower than an etch rate of the second peripheral material, and a second layer having a refractive index different from a refractive index of the first layer, and an antireflective layer provided between the substrate and the first meta-structure layer.

BRIEF DESCRIPTION OF THE DRAWINGS

The above and/or other aspects, features, and advantages of example embodiments of the disclosure will be more apparent from the following description taken in conjunction with the accompanying drawings, in which.

DETAILED DESCRIPTION

Figure 1:
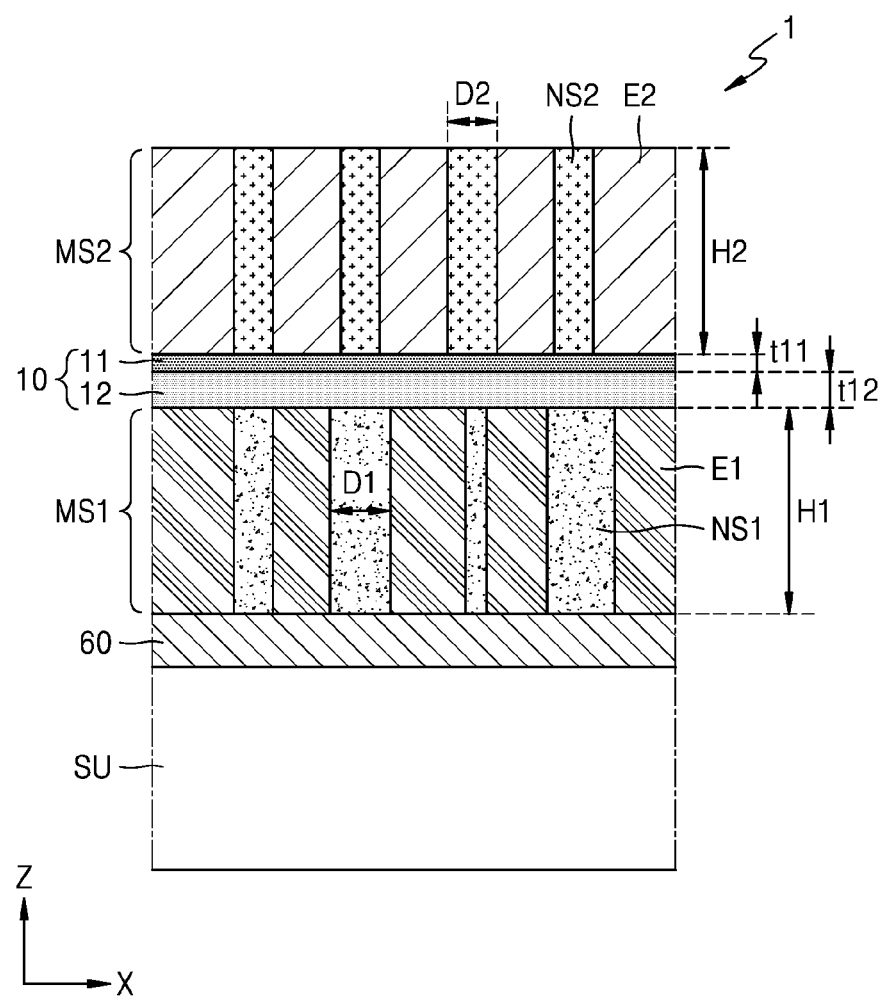
FIG. 1 is a cross-sectional view illustrating a structure of a meta-optical device according to an example embodiment.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects. As used herein, the term "and/or" includes any and all combinations of one or more of the associated listed items. Expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, or all of a, b, and c.

Hereinafter, example embodiments will be described in detail with reference to the accompanying drawings. The example embodiments to be described are merely examples, and various modifications may be made from the example embodiments. In the following drawings, the same reference numerals refer to the same components, and a size of each component in the drawings may be exaggerated for the sake of clear and convenient description.

Hereinafter, what is described as "upper portion" or "on" may also include not only components directly thereon in contact therewith but also components thereon without being in contact therewith.

Terms such as first and second may be used to describe various components but are used only for the purpose of distinguishing one component from another component. These terms are not intended to limit differences in materials or structures of components.

Singular expressions include plural expressions unless the context clearly indicates otherwise. In addition, when a portion "includes" a certain component, this means that other components may be further included rather than excluding other components unless specifically stated to the contrary.

In addition, terms such as " . . . unit", " . . . portion", and "module" described in the specification mean units that process at least one function or operation, which may be implemented as hardware or software, or as a combination of hardware and software.

Use of a term "the" and similar reference terms may correspond to both the singular and the plural.

Steps constituting a method may be performed in any suitable order unless there is a clear statement that the steps constituting the method should be performed in the order described. In addition, use of all example terms (for example, and so on) is merely for describing technical ideas in detail, and the scope of claims is not limited by the terms unless limited by the claims.

FIG. 1 is a cross-sectional view illustrating a structure of a meta-optical device according to an example embodiment.

A meta-optical device 1 is a flat diffraction element that modulates a phase of incident light. The meta-optical device 1 includes first nanostructures NS1 and the second nanostructures NS2 each having a shape dimension of a sub-wavelength smaller than a wavelength of light that is a phase modulation target and delays a phase of light passing through the first and second nanostructures NS1 and NS2 according to refractive index distribution formed by arrangement of the first and second nanostructures NS1 and NS2. Phase retardation (phase delay) varies depending on each position representing refractive index distribution. The refractive index distribution is formed by detailed shape dimensions, arrangement, and a refractive index difference between the first and second nanostructures NS1 and NS2 and the first peripheral material E1 and the second peripheral material E2. The meta-optical device 1 may represent various optical performances of a lens, a mirror, a beam deflector, and a beam shaper according to a shape of each position of phase retardation.

The meta-optical device 1 may include the first meta-structure layer MS1 and the second meta-structure layer MS2. The first meta-structure layer MS1 includes a first nanostructure NS1 having a sub-wavelength shape dimension and a first peripheral material E1 formed around the first nanostructure NS1. The first nanostructure NS1 and the first peripheral material E1 have different refractive indices. The second meta-structure layer MS2 includes a second nanostructure NS2 having a sub-wavelength shape dimension and a second peripheral material E2 formed around the second nanostructure NS2. The second nanostructure NS2 and the second peripheral material E2 have different refractive indices. The first meta-structure layer MS1 and the second meta-structure layer MS2 may be supported by a substrate SU. The first meta-structure layer MS1 may be provided on the substrate SU, and the second meta-structure layer MS2 may be provided on the first meta-structure layer MS1 opposite to the substrate SU.

Materials and shapes of the first nanostructure NS1, the first peripheral material E1, the second nanostructure NS2, and the second peripheral material E2 are set to have a refractive index distribution for forming a phase profile suitable for desired optical performance of the meta optical device 1. As illustrated, the first and second nanostructures NS1 and NS2 of the meta-optical device 1 may be arranged in a plurality of layers.

The first nanostructure NS1 may have a cylindrical shape with a diameter D1 and a height H1, and the second nanostructure NS2 may have a cylindrical shape with a diameter D2 and a height H2. However, this is an example, and the first and second nanostructures NS1 and NS2 may each be changed into a polygonal columnar shape, an elliptical columnar shape, or so on. According to another example embodiment, a cross-sectional shape perpendicular to a height direction (a Z direction) may be any shape and may be a symmetrical or asymmetrical shape. In addition, a width or a shape of a cross section perpendicular to the height direction (the Z direction) may not be constant. For example, a shape of a cross section parallel to the Z direction may be a trapezoidal shape. Shape dimensions of the first and second nanostructures NS1 and NS2 may be set according to a desired phase profile, and detailed dimensions thereof may vary depending on positions thereof. For example, the diameters D1 and D2 may not be constant and have sizes suitable for phase modulation determined for each position.

The diameter D1 of the first nanostructure NS1 and the diameter D2 of the second nanostructure NS2 may be sub-wavelengths. For example, when light to be phase-modulated is visible light, the diameters D1 and D2 may have sizes smaller than 400 nm, 300 nm, or 200 nm. The diameters D1 and D2 may be, for example, in the range of about 10 nm to about 500 nm. The height H1 of the first nanostructure NS1 and the height H2 of the second nanostructure NS2 may have dimension from a sub-wavelength to greater than a wavelength. The heights H1 and H2 may be, for example, in the range of about 500 nm to about 1500 nm. The first nanostructure NS1 and the second nanostructure NS2 may have a high aspect ratio greater than 1 such that optical resonance does not occur. For example, an aspect ratio represented as H1/D1 and H2/D2 may be greater than 1 or may be 5 or may be greater than or equal to 10 or may be less than or equal to 20 or may be less than or equal to 60.

The first nanostructure NS1 may be formed of a material having a higher refractive index than a refractive index of the first peripheral material E1 or vice versa. A refractive index difference between the first nanostructure NS1 and the first peripheral material E1 may be greater than or equal to 2. The second nanostructure NS2 may be formed of a material having a higher refractive index than a refractive index of the second peripheral material E2 or vice versa. A refractive index difference between the second nanostructure NS2 and the second peripheral material E2 may be greater than or equal to 2. A material having a high refractive index used for the first meta-structure layer MS1 and the second meta-structure layer MS2 may include, for example, c-Si, p-Si, a-Si and III-V compound semiconductors (gallium phosphide (GaP), gallium nitride (GaN), gallium arsenide (GaAs), etc.), silicon carbide (SiC), titanium oxide ($TiO_2$), silicon nitride (SiN), and/or combinations thereof. A material having a low refractive index used for the first meta-structure layer MS1 and the second meta-structure layer MS2 may include silicon oxide ($SiO_2$), siloxane-based spin on glass (SOG), or air.

The substrate SU supports the first meta-structure layer MS1 and may be formed of, for example, a material transparent to light of an operating wavelength band of the meta-optical device 1. The substrate SU may be formed of a dielectric material having a refractive index lower than a material having a high refractive index included in the first meta-structure layer MS1, such as $SiO_2$ or SOG.

A shape dimension of each of components included in the meta-optical device 1 may be a variable directly connected to performance of the meta-optical device 1, and thus, a process of manufacturing the meta-optical device 1 including the first and second nanostructures NS1 and NS2 with a high aspect ratio has a high degree of difficulty. In the manufacturing process, a pattern corresponding to the first and second nanostructures NS1 and NS2 is first formed through a film forming process, a photolithography process, and an etching process, and then the inside of the pattern is filled with a material forming the first and second nanostructures NS1 and NS2, and at this time, it is necessary to precisely control a deep etch depth. An etch stop layer, which is generally used for this purpose, is included in a final finished structure, and optical performance may be reduced due to light reflection occurring at an interface thereof.

The meta-optical device 1 according to the example embodiment includes a first functional layer 10 arranged between the first meta-structure layer MS1 and the second meta-structure layer MS2. The first functional layer 10 serves as an etch stop layer used in the manufacturing process of the meta-optical device 1, and also serves to reduce the amount of light reflected at an interface between the first meta-structure layer MS1 and the second meta-structure layer MS2. For this, the first functional layer 10 includes a first layer 11 serving as an etch stop layer, and a second layer 12 for meeting a refractive index requirement suitable for antireflection. The second layer 12 may have a refractive index different from a refractive index of the first layer 11. When a material and a thickness t11 of the first layer 11 are set for a function of the first layer 11 as an etch stop layer, a material and a thickness t12 of the second layer 12 are set to implement a target refractive index required for the first functional layer 10 together with the refractive index of the first layer 11.

When the meta-optical device 1 is manufactured in the order of the substrate SU, the first meta-structure layer MS1, and the second meta-structure layer MS2, in order to form the second meta-structure layer MS2, a material corresponding to the second peripheral material E2 is formed on the entire surface of the first meta-structure layer MS1, and a pattern for forming the second nanostructure NS2 is formed through photolithography and etching processes. For example, a process of etching a material that forms the second peripheral material E2 in a preset pattern is performed, and in this process, the first meta-structure layer MS1 which is a lower structure may be damaged. When the second meta-structure layer MS2 is formed over the first meta-structure layer MS1, the first layer 11 serves as an etch stop layer that protects the first meta-structure layer MS1 during an etching process.

When the second meta-structure layer MS2 is formed over the first meta-structure layer MS1, an etching process utilizing the etch stop layer is performed, and thus, the first meta-structure layer MS1 previously formed is not damaged and a height or a shape thereof may be well maintained. Accordingly, a refractive index distribution for a phase profile to be displayed by the first meta-structure layer MS1 may be well maintained. In addition, by the etch stop layer, the etched depth may be constant, and thus, the height H2 of the second meta-structure layer MS2 may be well formed to a desired height. Accordingly, a refractive index distribution for a phase profile to be displayed by the second meta-structure layer MS2 may be well implemented.

In addition, the etch stop layer needs to be formed of a material with an etch rate lower than an etch rate of the second peripheral material E2, and the second peripheral material E2 has to be set as a material with a refractive index difference that is suitable in relation to the first nanostructure NS1. Due to the requirements, materials that may be used as the etch stop layer are limited, and thus, it is difficult to have an appropriate refractive index to reduce reflectance. The second layer 12 is formed to compensate for this point and includes a material having a refractive index different from a refractive index of the first layer 11 and, together with the first layer 11, allows the first functional layer 10 to have a desired target refractive index. The target refractive index is a theoretical refractive index required to effective medium between two materials, in order to reduce reflection occurring at an interface between the two materials having different refractive indices.

In this way, the first functional layer 10 serves as an etch stop layer, and a detailed configuration of the first functional layer 10 is determined to have a target refractive index and a thickness that may reduce the amount of reflection as much as possible when light passes through a boundary between the first and second meta-structure layers MS1 and MS2.

A material of the first layer 11 is selected to have an etch rate lower than an etch rate of the second peripheral material E2. The type of material that may be used as the first layer 11 is determined by an etch rate requirement. For example, when the second peripheral material E2 is formed of $SiO_2$, a material, such as silicon nitride ($Si_3N_4$), silicon oxynitride (SiON_, aluminum oxide ($Al_2O_3$), or hafnium oxide ($HfO_2$) may be used for the first layer 11. According to another example embodiment, when the second peripheral material E2 is SiN, $HfO_2$ may be used for the first layer 11.

A thickness of the first layer 11 may be determined by considering the amount of materials removed by etching, For example, a thickness of the second peripheral material E2 and an etch distribution on a wafer on which an etching process is performed. For example, the thickness of the first layer 11 may be greater than or equal to 5 nm or may be greater than or equal to 10 nm or may be greater than or equal to 50 nm and may be less than or equal to 200 nm or may be less than or equal to 150 nm or may be less than or equal to 100. The thickness of the first layer 11 may be greater than or equal to 50 nm and less than or equal to 100 nm. A lower limit of a range of the thickness of the first layer 11 may be increased as the amount to be removed by etching increases, and the thickness of the first layer 11 may be greater than or equal to 1% of the height H2 of the second meta-structure layer MS2 or greater than or equal to 2% thereof.

A material used for the second layer 12 and a thickness thereof may be determined by considering a target refractive index to be represented by the first functional layer 10 as a whole. When an effective refractive index of the first meta-structure layer MS1 is n1 and an effective refractive index of the second meta-structure layer MS2 is n2, a target refractive index n_target of the first functional layer 10 is between n1 and n2. For example, when n1<n2, n1<n_target<n2, and when n1>n2, n2<n_target<n1. The target refractive index may be a value similar to $(n1*n2)^{1/2}$ but is not limited thereto. Here, the effective refractive index may be a refractive index distribution indicated by arrangement of structures having different refractive indices is expressed as one kind of optically equivalent effective media and may be calculated through computational simulation or on the like. Hereinafter, when expressed as a "refractive index" of a component and when the component includes a plurality of types of materials having different refractive indices, the refractive index may be interpreted as indicating an "effective refractive index". When a refractive index of the first layer 11 determined according to requirement of an etch rate is greater than a target refractive index, the second layer 12 may be formed of a material having a lower refractive index than the target refractive index. When the refractive index of the first layer 11 is less than the target refractive index, the second layer 12 may be formed of a material having a refractive index greater than the target refractive index.

For example, the first layer 11 and the second layer 12 may have different refractive indices, where one of the first layer 11 and the second layer 12 is formed of a material having a refractive index greater than the target refractive index, and the other is formed of a material having a refractive index less than the target refractive index. One of the first layer 11 and the second layer 12 is formed of a material having a refractive index greater than $(n1*n2)^{1/2}$, and the other is formed of a material having a refractive index less than $(n1*n2)^{1/2}$. The material and thickness t12 of the second layer 12 may be set by considering the refractive index of the first layer 11, the thickness t11 of the first layer 11, and a total thickness of the first functional layer 10. The total thickness of the first functional layer 10 may be determined such that transmittance of the meta-optical device 1 is maximized by using calculation of a transfer matrix method or other computational simulations. When a central wavelength of a wavelength range of target light to be phase-modulated by the meta-optical device 1 is referred to as λc, a total thickness of the first functional layer 10 may be less than λc. The total thickness of the first functional layer 10 may be greater than or equal to λc/10 and less than 1nc. The wavelength range of the target light to be phase-modulated by the meta-optical device 1 may include a visible light band or an infrared to visible light band.

Figure 3:
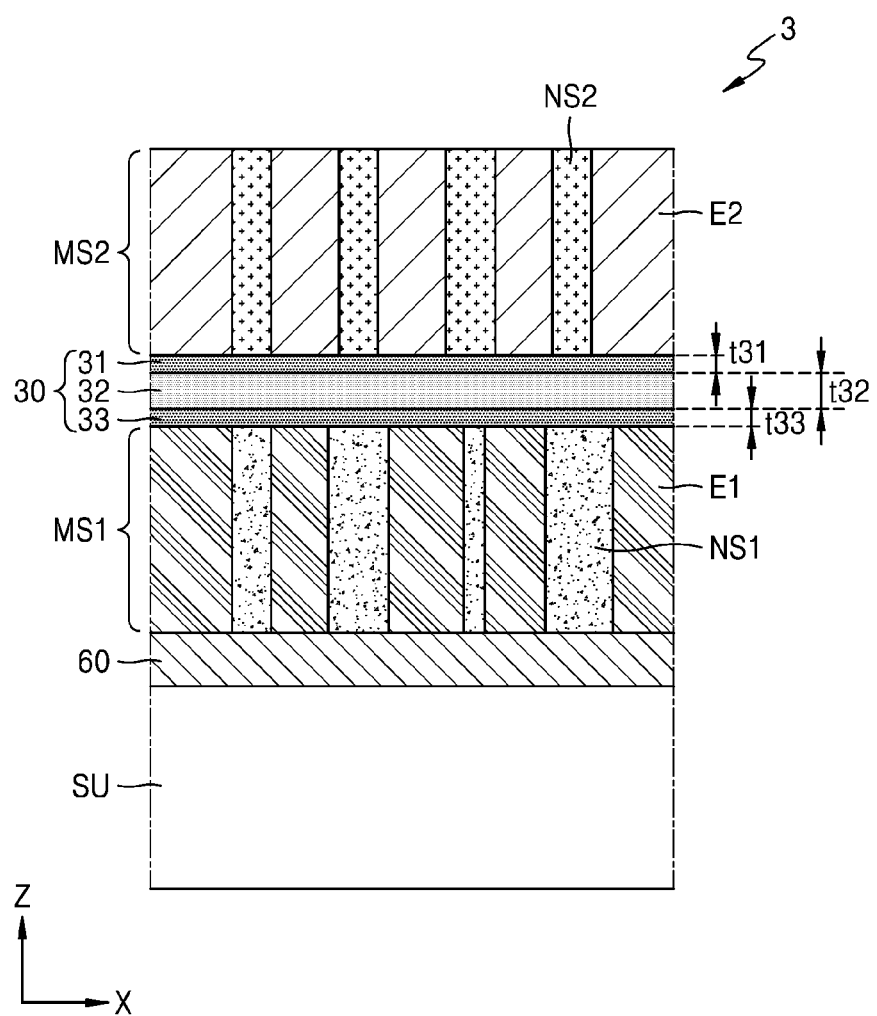
FIG. 3 is a cross-sectional view illustrating a structure of a meta-optical device according to another example embodiment.

Referring to FIG. 3, an antireflective layer 60 may be between the substrate SU and the first meta-structure layer MS1. The antireflective layer 60 reduces reflection occurring between the substrate SU and the first meta-structure layer MS1. The antireflective layer 60 may be formed of a material having a refractive index between ns and n1 when an effective refractive index of the first meta-structure layer MS1 is n1 and a refractive index of the substrate SU is ns. A thickness of the antireflective layer 60 may be in the range of λc/10 to λc. The antireflective layer 60 may be composed of a plurality of layers, and for example, a thickness and a material of each of the plurality of layers may be set to maximize transmittance. The antireflective layer 60 may be omitted. When the effective refractive index of the first meta-structure layer MS1 is similar to the refractive index of the substrate SU, for example, when a difference between the effective refractive index of the first meta-structure layer MS1 and the refractive index of the substrate SU is close to zero or negligible, the antireflective layer 60 may not be provided between the substrate SU and the first meta-structure layer MS1.

Figure 2:
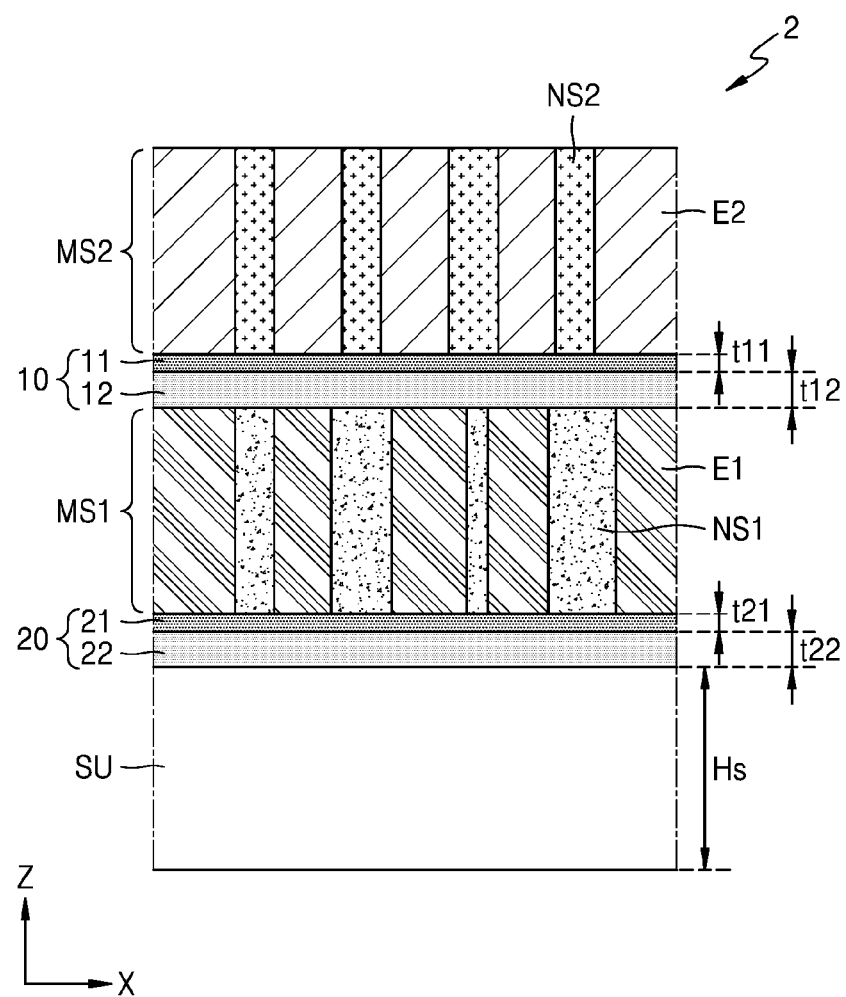
FIG. 2 is a cross-sectional view illustrating a structure of a meta-optical device according to another example embodiment.

FIG. 2 is a cross-sectional view illustrating a structure of a meta-optical device according to another example embodiment.

A meta-optical device 2 according to the example embodiment is different from the meta-optical device 1 of FIG. 1 in that a second functional layer 20 is between the substrate SU and the first meta-structure layer MS1 similar to the structure in which the first functional layer 10 is between the first meta-structure layer MS1 and the second meta-structure layer MS2.

The second functional layer 20 includes a first layer 21 serving as an etch stop layer, and a second layer 22 that supplements a refractive index of the first layer 21 to meet a target refractive index of the second functional layer 20. The first layer 21 includes a material with an etch rate lower than an etch rate of the first peripheral material E1. For example, when the first peripheral material E1 is $SiO_2$, a material such as $Si_3N_4$, SiON, $Al_2O_3$, or $HfO_2$ may be used for the first layer 21. According to another example embodiment, when the first peripheral material E1 is SiN, $HfO_2$ may be used for the first layer 21.

When the first meta-structure layer MS1 is formed over the substrate SU, the first layer 21 serves as an etch stop layer that protects the substrate SU during an etching process. In a general situation, protecting the substrate SU during the etching process may be of little significance. However, when there is a set requirement for a height Hs of the substrate SU such as a case in which the meta-optical device 2 is integrally formed with other components, the meta-optical device 2 may be appropriately manufactured by using an etch stop layer. In addition, an etch depth may be more precisely controlled by the etch stop layer, and thus, a height of the first nanostructure NS1 may be well formed as desired.

A thickness of the first layer 21 may be determined by considering the amount of material removed by etching. For example, a thickness of the first peripheral material E1, and an etch distribution on a wafer on which the etching process is performed. For example, the thickness of the first layer 21 may be greater than or equal to 5 nm or may be greater than or equal to 10 nm or may be greater than or equal to 50 nm and may be less than or equal to 200 nm or may be less than or equal to 150 nm or may be less than or equal to 100 nm. The thickness of the first layer 21 may be greater than or equal to 50 nm and less than or equal to 100 nm. A lower limit of a range of a thickness t21 of the first layer 21 may be increased as the amount to be removed by etching increases, and a thickness t21 of the first layer 21 may be greater than or equal to 1% of the height H1 of the first meta-structure layer MS1 or greater than or equal to 2% thereof.

A material used for the second layer 22 and a thickness thereof may be determined by considering an effective refractive index to be represented by the second functional layer 20 as a whole. When an effective refractive index of the first meta-structure layer MS1 is n1 and a refractive index of the substrate SU is ns, a target refractive index of the second functional layer 20 is $(ns*n1)^{1/2}$. When a refractive index of the first layer 21 determined according to requirement of an etch rate is greater than a target refractive index, the second layer 22 may be formed of a material having a lower refractive index than the target refractive index. When the refractive index of the first layer 21 is less than the target refractive index, the second layer 22 may be formed of a material having a refractive index greater than the target refractive index.

For example, the first layer 21 and the second layer 22 may have different refractive indices, where one of the first layer 21 and the second layer 22 is formed of a material having a refractive index greater than the target refractive index, and the other is formed of a material having a refractive index less than the target refractive index. One of the first layer 21 and the second layer 22 is formed of a material having a refractive index greater than $(ns*n1)^{1/2}$, and the other is formed of a material having a refractive index less than $(ns*n1)^{1/2}$. The material and thickness t22 of the second layer 22 may be set by considering the refractive index of the first layer 21, the thickness t21 of the first layer 21, and a total thickness of the first functional layer 20. A total thickness of the second functional layer 20 may be in the range of λc/10 to λc when a central wavelength of a wavelength range of target light to be phase-modulated by the meta-optical device 2 is referred to as λc.

FIG. 3 is a cross-sectional view illustrating a structure of a meta-optical device according to another example embodiment.

A meta-optical device 3 according to the example embodiment is different from the meta-optical device 1 of FIG. 1 in a detailed structure of a first functional layer 30, and the rest thereof is substantially the same.

The first functional layer 30 includes a first layer 31 serving as an etch stop layer, a second layer 32 and a third layer 33 that supplement a refractive index of the first layer 31 to meet a target refractive index thereof. For example, the third layer 33 may have the same refractive index as the first layer 31, and a thickness t33 of the third layer 33 may be the same as a thickness t31 of the first layer 31. In this case, the first functional layer 30 has a layer structure with symmetry. An effect of the structure is described below with reference to FIG. 12A or more when compared with related examples.

In the structure, a thickness t32 and a refractive index of the second layer 32 may be set by considering the thickness t33 and refractive index of the third layer 33 that is additionally provided. In addition, the third layer 33 is not limited to having the same refractive index and thickness as the first layer 31. For example, when it is difficult to meet a target refractive index requirement with only one layer of the second layer 32 because a target refractive index difference between the first layer 31 serving as an etch stop layer and the first functional layer 30 is relatively large, the third layer 33 may be considered to be additionally provided. A total thickness of the first functional layer 30 may be in the range of λc/10 to λc.

Figure 4:
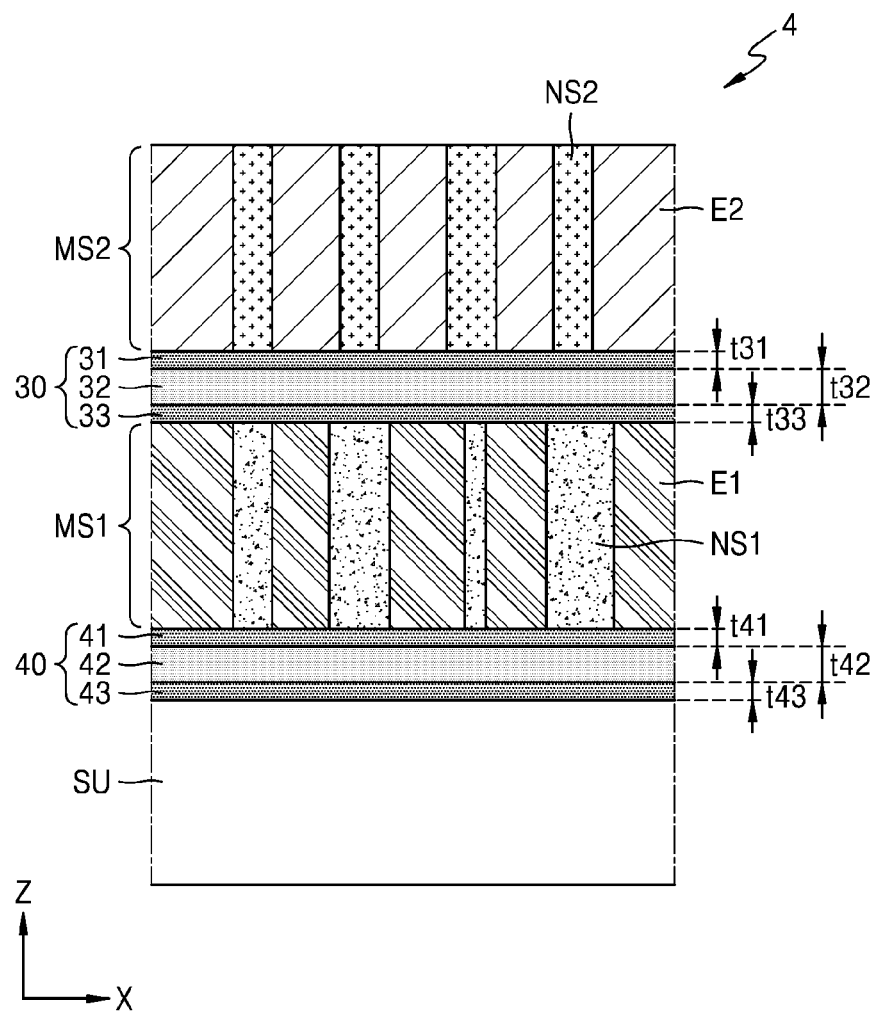
FIG. 4 is a cross-sectional view illustrating a structure of a meta-optical device according to another example embodiment.

FIG. 4 is a cross-sectional view illustrating a structure of a meta-optical device according to another example embodiment.

A meta-optical device 4 according to the example embodiment is different from the meta-optical device 1 of FIG. 1 in that a second functional layer 40 having a three-layer structure is between the substrate SU and the first meta-structure layer MS1, and the rest there is substantially the same.

The first functional layer 40 includes a first layer 41 serving as an etch stop layer, a second layer 42 and a third layer 43 that supplement a refractive index of the first layer 41 to meet a target refractive index thereof. A refractive index of the third layer 43 may be the same as the t refractive index of the first layer 41, and a thickness t43 of the third layer 43 may be the same as a thickness t41 of the first layer 41. A second layer 42 may be between the first layer 41 and the third layer 43. However, the refractive index and the thickness t31 of the third layer 43 are not limited to the refractive index and thickness of the first layer 41 and may be set such that the second functional layer 40 may implement a target refractive index by considering the refractive index of the first layer 41 serving as an etch stop layer. A total thickness of the second functional layer 40 may be in the range of $\lambda c/10$ to $\lambda c$.

Figure 5:
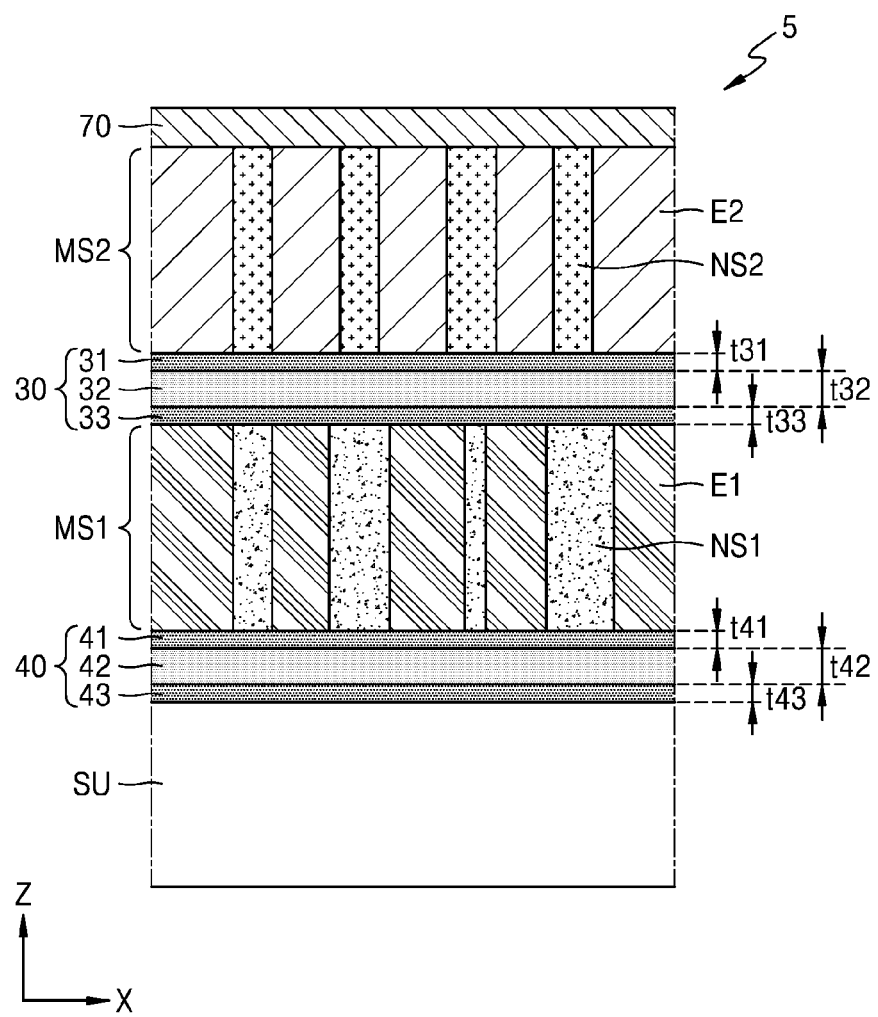
FIG. 5 is a cross-sectional view illustrating a structure of a meta-optical device according to another example embodiment.

FIG. 5 is a cross-sectional view illustrating a structure of a meta-optical device according to another example embodiment.

A meta-optical device 5 according to the example embodiment is different from the meta-optical device 4 of FIG. 4 in that an antireflective layer 70 is further provided on the second meta-structure layer MS2, and the rest thereof is substantially the same.

The antireflective layer 70 reduces reflection occurring at a boundary where light incident on the meta-optical device 5 meets the second meta-structure layer MS2. The antireflective layer 70 may be formed of a material having a refractive index between 1 and n2 when an effective refractive index of the second meta-structure layer MS1 is referred to as n2. A thickness of the antireflective layer 70 may be in the range of $\lambda c/10$ to $\lambda c$. The antireflective layer 70 may be formed of a plurality of layers, and for example, a thickness and a material of the plurality of layers may be set to maximize transmittance.

Figure 6:
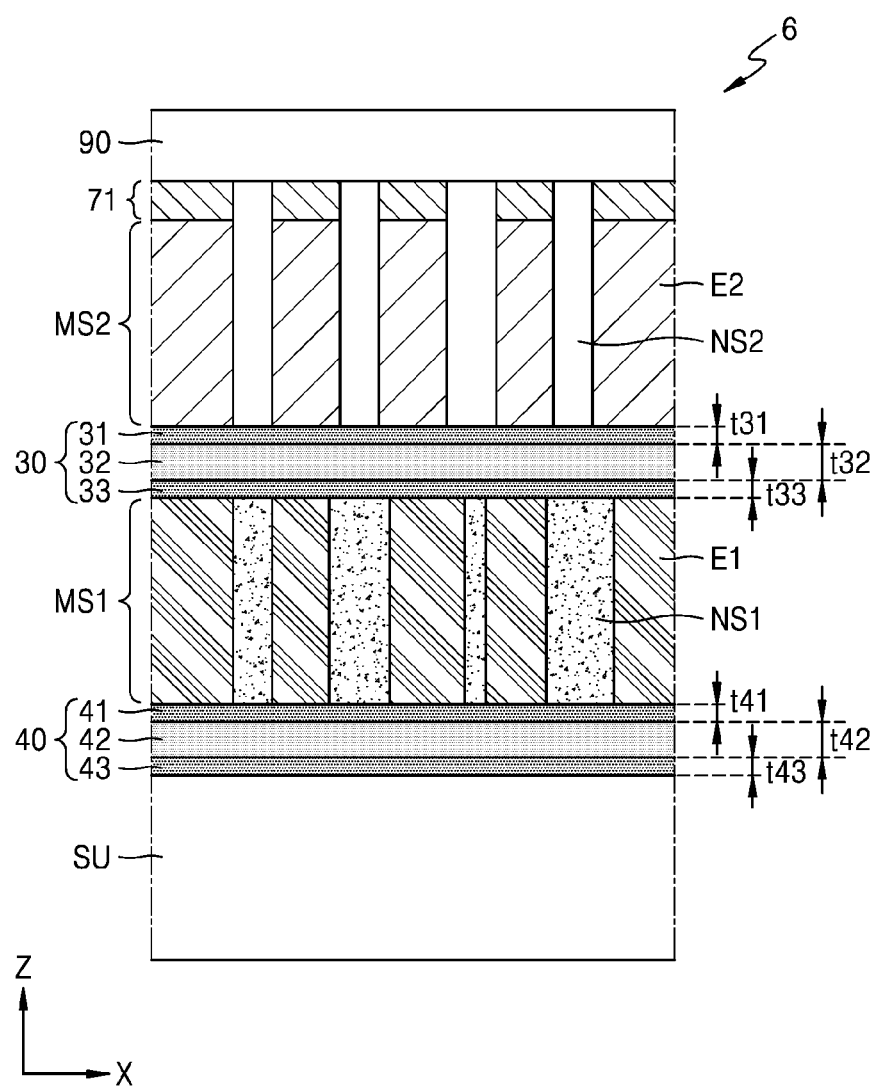
FIG. 6 is a cross-sectional view illustrating a structure of a meta-optical device according to another example embodiment.

FIG. 6 is a cross-sectional view illustrating a structure of a meta optical device according to another example embodiment.

A meta-optical device 6 according to the example embodiment is different from the meta-optical device 5 in that detailed shapes of a second meta-structure layer MS2 and an antireflective layer 71 are different therefrom and a protective layer 90 is further provided on the antireflective layer 71.

A second nanostructure NS2 of the second meta-structure layer MS2 may have a shape of a hole surrounded by and provided adjacent to a second peripheral material E2. For example, the second nanostructure NS2 may have a shape of a hollow hole column. The shape may be such that a refractive index difference between the second nanostructure NS2 and the second peripheral material E2 may be maximized. However, when the antireflective layer 70 illustrated in FIG. 5 is to be formed on the second meta-structure layer MS2, there is a risk that a material forming the antireflective layer 70 enters the hole. The meta-optical device 6 according to an example embodiment may be manufactured by sequentially stacking a material formed of a material of the second peripheral material E2 and a material formed of a material of the antireflective layer 71 on the entire upper surface of the first functional layer 30 and then patterning the two material layers in a shape corresponding to the second nanostructure NS2. Accordingly, the hole constituting the second nanostructure NS2 has a shape extending through the antireflective layer 71 to an interface with the protective layer 90. In addition, the protective layer 90 having a relatively greater thickness than a thickness of the antireflective layer 71 may be formed to prevent a material of the protective layer 90 from entering the hole by adjusting a step coverage.

Figure 7:
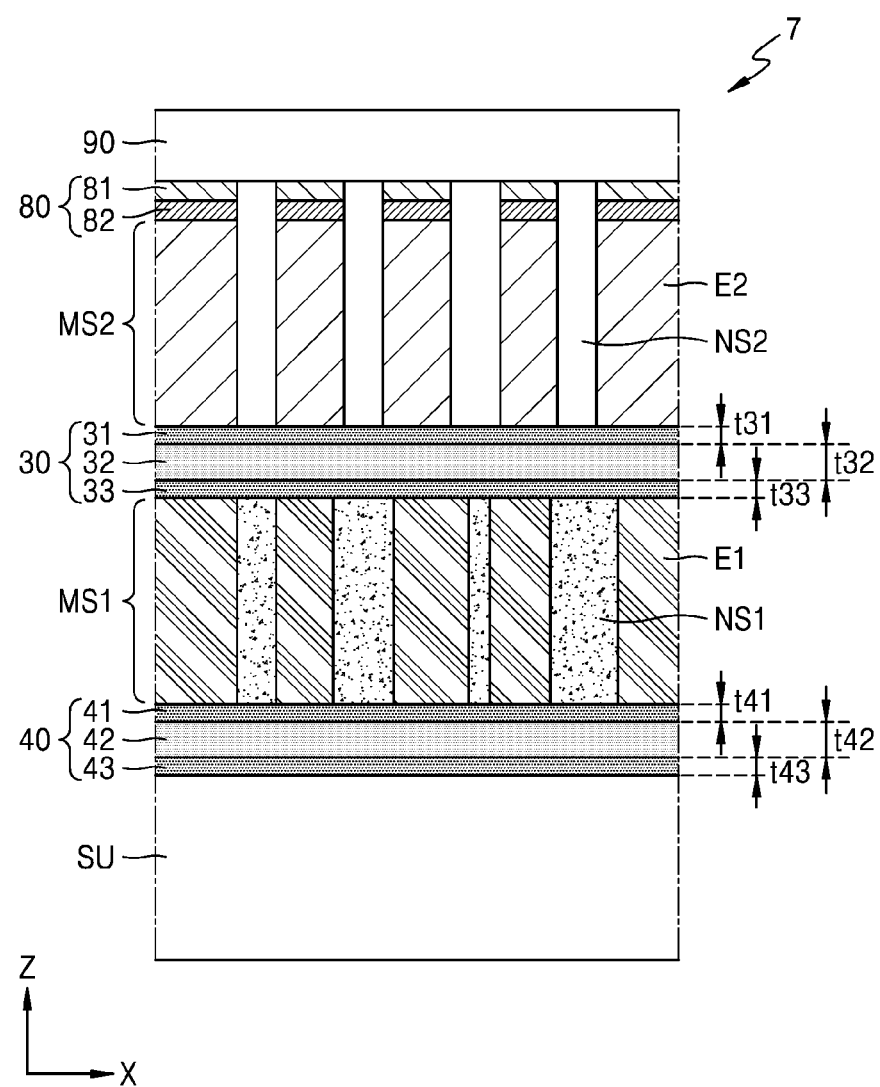
FIG. 7 is a cross-sectional view illustrating a structure of a meta-optical device according to another example embodiment.

FIG. 7 is a cross-sectional view illustrating a structure of a meta-optical device according to another example embodiment.

A meta-optical device 7 according to the example embodiment is different from the meta-optical device 6 of FIG. 6 in that an antireflective layer 80 between the second meta-structure layer MS2 and the protective layer 90 has a multi-layer structure.

The antireflective layer 80 may include two layers 81 and 82 having different refractive indices. The layer 82 may be formed of the same material as the protective layer 90, and the layer 81 may be formed of a material having a refractive index different from a refractive index of the protective layer 90. The layer 82 formed of a material different from a material of the protective layer 90 may be in contact with the protective layer 90.

Figure 8:
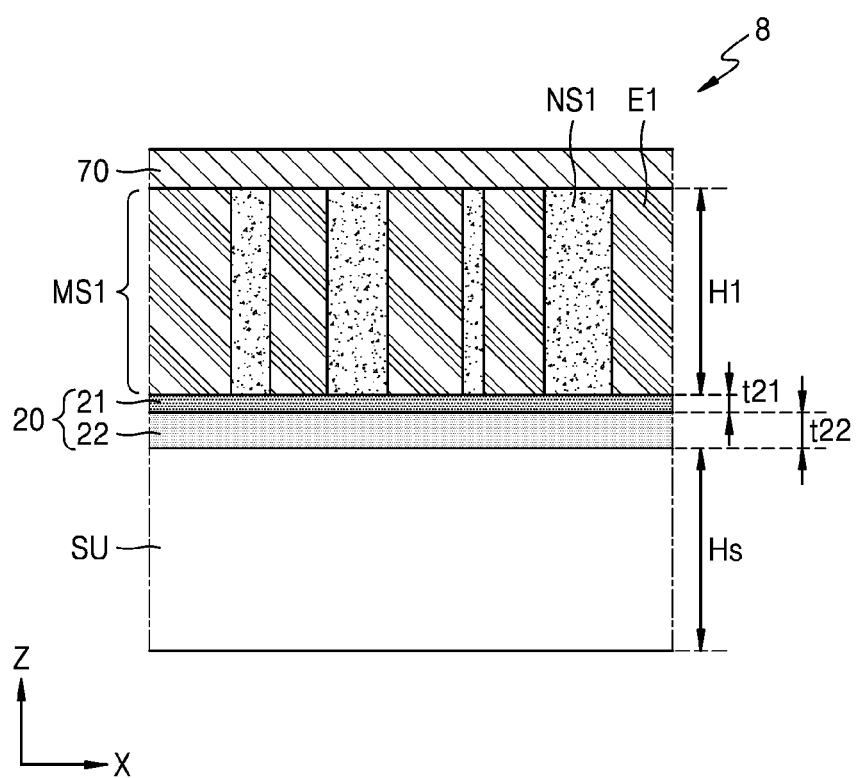
FIG. 8 is a cross-sectional view illustrating a structure of a meta-optical device according to another example embodiment.

FIG. 8 is a cross-sectional view illustrating a structure of a meta optical device according to another example embodiment.

A meta-optical device 8 includes a first meta-structure layer MS1 including a first nanostructure NS1 having a sub-wavelength shape dimension and a first peripheral material E1 formed around the first nanostructure NS1. The first meta-structure layer MS1 is over the substrate SU, and a second functional layer 20 is between the substrate SU and the first meta-structure layer MS1.

The second functional layer 20 may include a first layer 21 having a refractive index and a thickness t21 set to serve as an etch stop layer and a second layer 22 that supplements a refractive index of the first layer 21 to meet a target refractive index of the second functional layer 20, which is similar to the structure described with reference to FIG. 2. The first layer 21 includes a material with an etch rate lower than an etch rate of the first peripheral material E1. For example, when the first peripheral material E1 is formed of $SiO_2$, a material, such as $Si_3N_4$, SiON, $Al_2O_3$, or $HfO_2$ may be used for the first layer 21. According to another example embodiment, when the first peripheral material E1 is SiN, $HfO_2$ may be used for the first layer 21.

When a refractive index of the substrate SU is ns and an effective refractive index of the first meta-structure layer MS1 is n1, one of refractive indices of the first layer 21 and the second layer 22 may be greater than $(ns*n1)^{1/2}$, and the other may be less than $(ns*n1)^{1/2}$.

An antireflective layer 75 may be on the first meta-structure layer MS1. The antireflective layer 75 may have a refractive index between the effective refractive index n1 of the first meta-structure layer MS1 and 1. The antireflective layer 75 may be formed of a material having a refractive index between 1 and n1 when the effective refractive index of the first meta-structure layer MS1 is n1. A thickness of the antireflective layer 75 may be in the range of $\lambda c/10$ to $\lambda c$. The antireflective layer 75 may be formed of a plurality of layers, and for example, a thickness and a material of each of the plurality of layers may be set to maximize transmittance.

The meta-optical device 8 according to the example embodiment is different from the meta-optical devices of FIGS. 1 to 7 described above in that the meta-optical device 8 includes the first meta-structure layer MS1 of a single layer. A requirement of a height Hs of the substrate SU or a requirement of a height H1 of the first meta-structure layer MS1 may be met by the second functional layer 20 between the substrate SU and the first meta-structure layer MS1, and similarly, light reflection between the first meta-structure layer MS1 and the substrate SU may be reduced.

Figure 9:
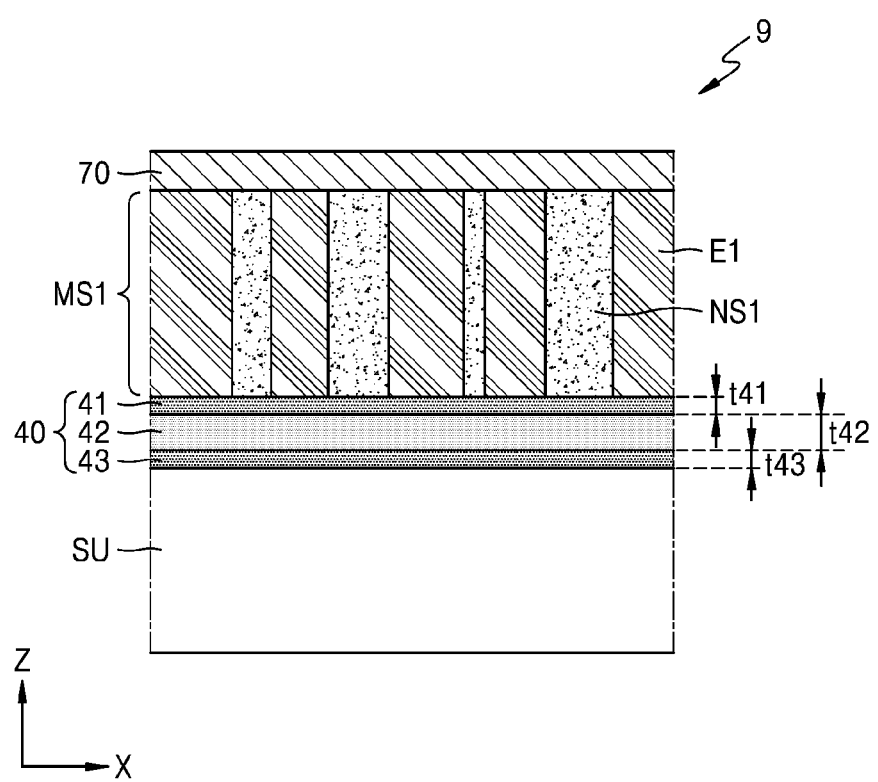
FIG. 9 is a cross-sectional view illustrating a structure of a meta-optical device according to another example embodiment.

FIG. 9 is a cross-sectional view illustrating a structure of a meta-optical device according to another example embodiment.

A meta-optical device 9 according to the example embodiment is different from the meta-optical device 8 of FIG. 8 in that a second functional layer 40 is formed in a three-layer structure, and the rest thereof is substantially the same. Because the second functional layer 40 is substantially the same as the second functional layer 40 described with reference to FIG. 4, descriptions thereof are omitted.

Figure 10:
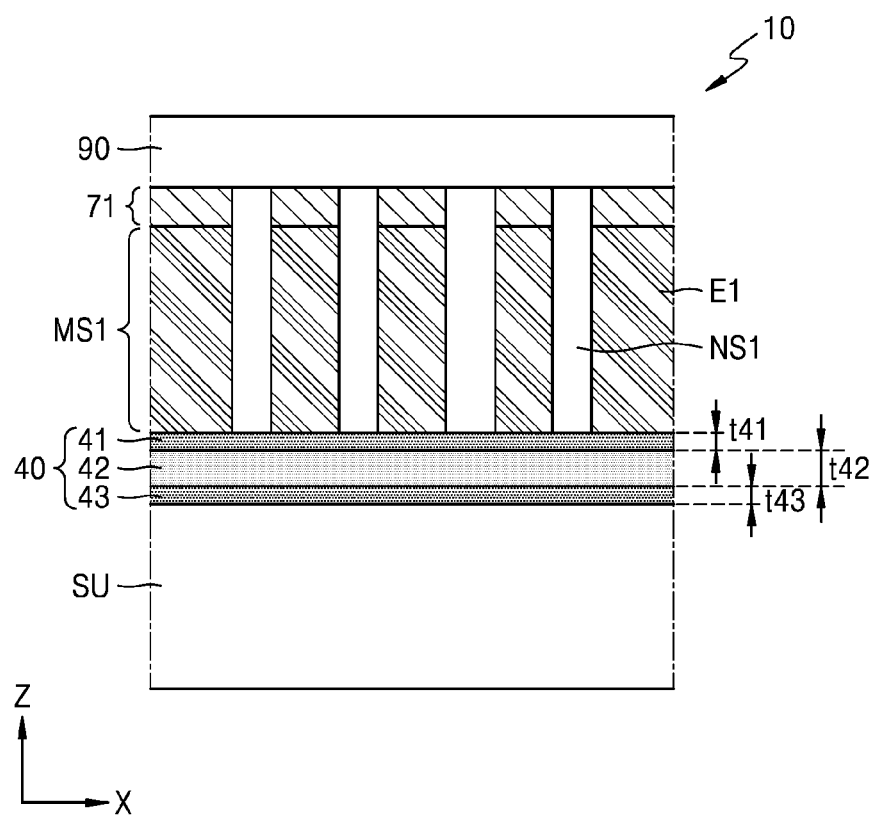
FIG. 10 is a cross-sectional view illustrating a structure of a meta-optical device according to another example embodiment.

FIG. 10 is a cross-sectional view illustrating a structure of a meta-optical device according to another example embodiment.

A meta-optical device 10 according to the example embodiment is different from the meta-optical device 9 of FIG. 9 in that detailed shapes of a first meta-structure layer MS1 and an antireflective layer 71 are different therefrom and a protective layer 90 is further provided on the antireflective layer 71.

A first nanostructure NS1 of the first meta-structure layer MS1 may have a shape of a hole surrounded by and provided adjacent to a second peripheral material E2. For example, the first nanostructure NS1 may have a shape of a hollow hole column, which may increase a refractive index difference in the first meta-structure layer MS1 as much as possible. However, when the antireflective layer 71 is formed on the first meta-structure layer MS1, there is a risk that a material forming the antireflective layer 71 may enter the hole. The meta-optical device 10 according to an example embodiment may be manufactured by sequentially stacking a material layer formed of a material of the first peripheral material E1 and a material layer formed of a material of the antireflective layer 71 on the entire upper surface of the second functional layer 40 and then patterning the two material layers in a shape corresponding to the first nanostructure NS1. Accordingly, the hole constituting the first nanostructure NS1 has a shape extending through the antireflective layer 71 to an interface with the protective layer 90. In addition, the protective layer 90 having a relatively greater thickness than a thickness of the antireflective layer 71 may be formed to prevent a material of the protective layer 90 from entering the hole by adjusting a step coverage.

Figure 11:
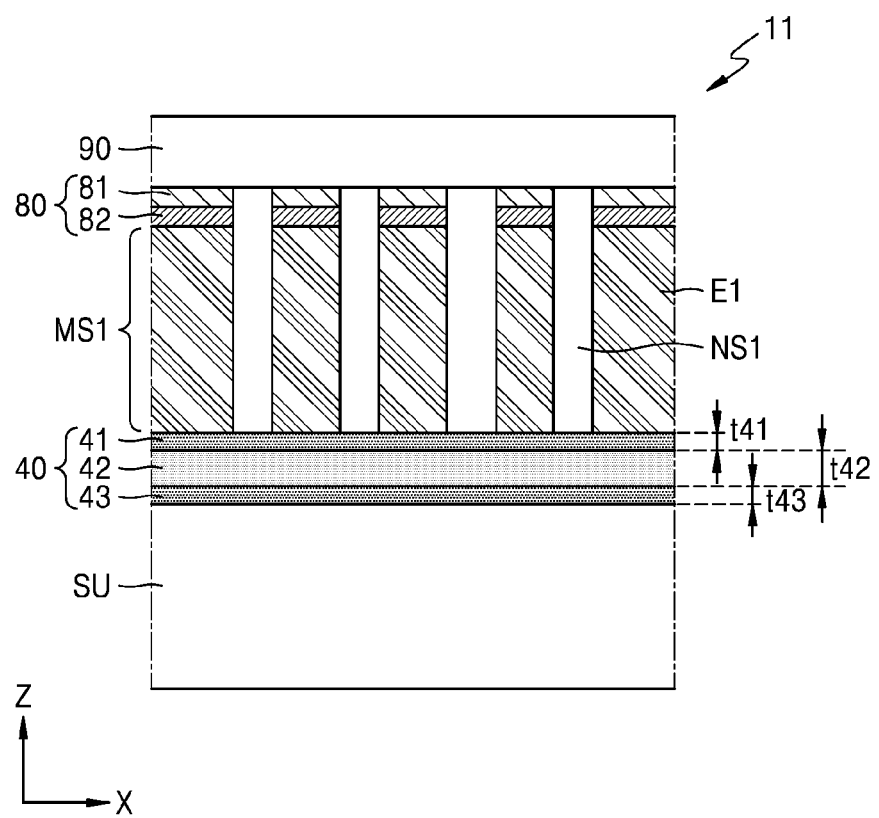
FIG. 11 is a cross-sectional view illustrating a structure of a meta-optical device according to another example embodiment.

FIG. 11 is a cross-sectional view illustrating a structure of a meta-optical device according to another example embodiment.

A meta-optical device 11 according to the example embodiment is different from the meta-optical device 10 of FIG. 10 in that an antireflective layer 85 between the first meta-structure layer MS1 and the protective layer 90 has a multi-layer structure.

The antireflective layer 85 may include two layers 86 and 87 having different refractive indices. The layer 87 may be formed of the same material as the protective layer 90, and the layer 86 may be formed of a material having a refractive index different from a refractive index of the protective layer 90. The layer 86 formed of a material different from a material of the protective layer 90 may be in contact with the protective layer 90.

Figure 12A:
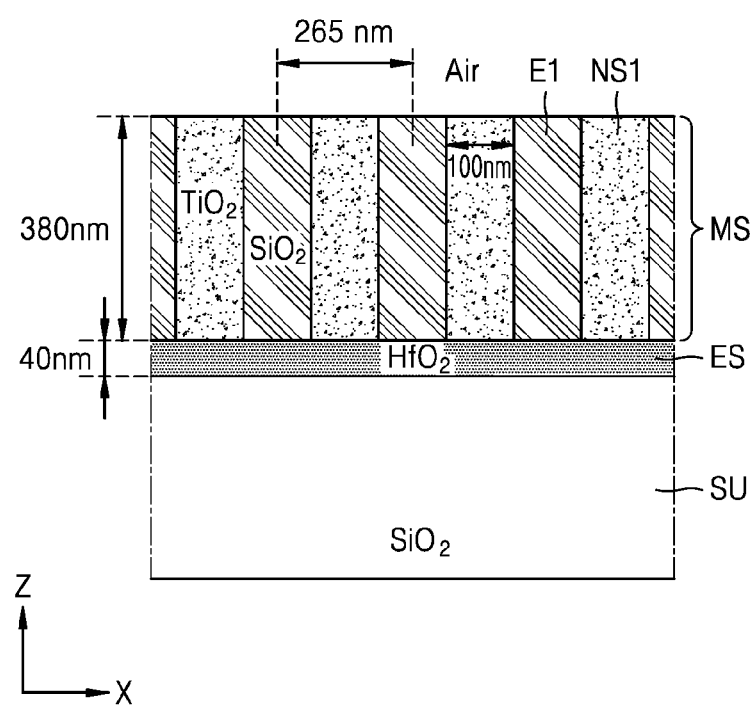
FIG. 12A is a cross-sectional view illustrating a structure of a meta-optical device according to a related example and materials and shape dimensions used for computational simulation.
Figure 12B:
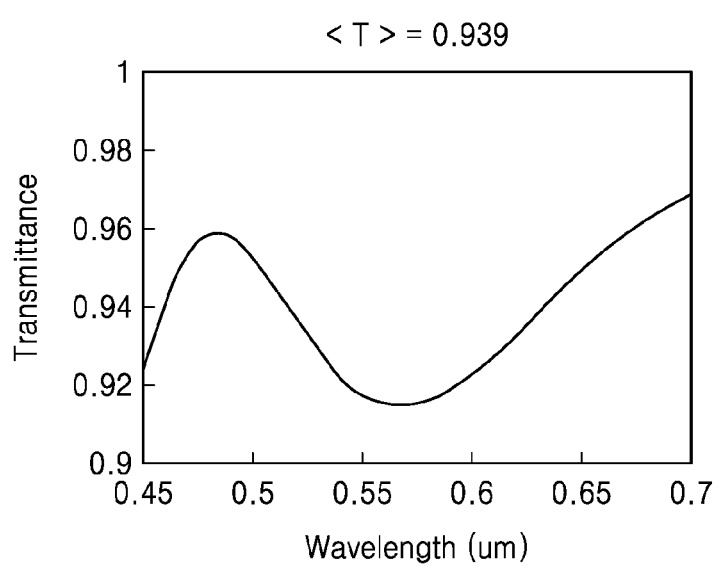
FIG. 12B is a graph illustrating a transmittance computational simulation result for FIG. 12A.

FIG. 12A is a cross-sectional view illustrating a structure of the meta-optical device according to a related example and materials and shape dimensions used for computational simulation, and FIG. 12B is a graph illustrating a transmittance computational simulation result for FIG. 12A.

The meta-optical device according to the related example of FIG. 12A includes an etch stop layer ES of a single layer between the substrate SU and a meta-structure layer MS. Average transmittance <T> is about 0.939 in a wavelength band between 0.45 μm and 0.7 μm.

Figure 13A:
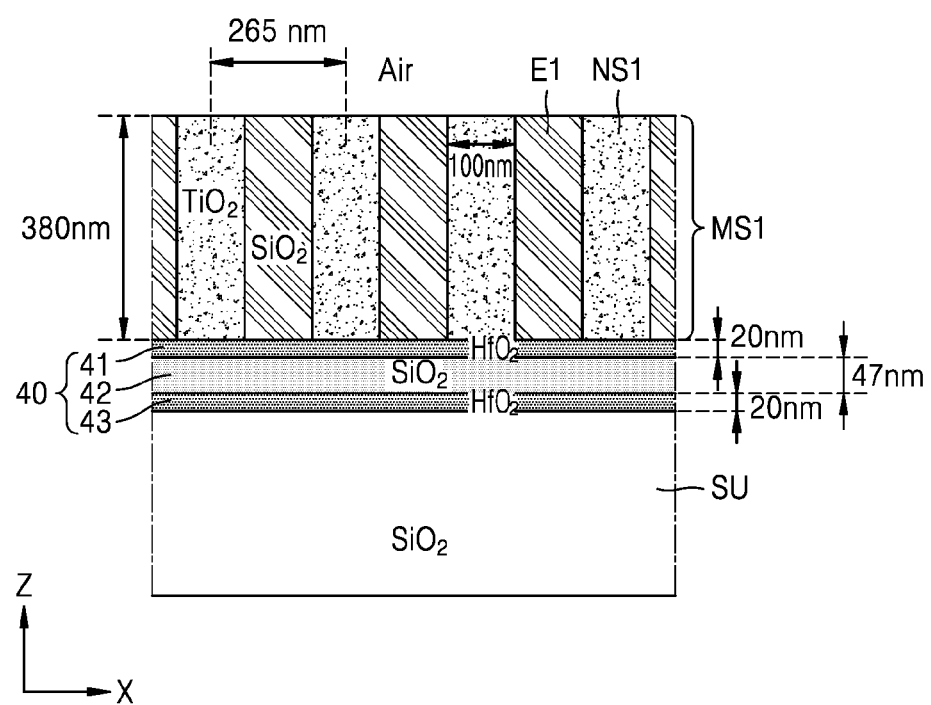
FIG. 13A is a cross-sectional view illustrating a structure of a meta-optical device according to an example embodiment and materials and shape dimensions used for computational simulation.
Figure 13B:
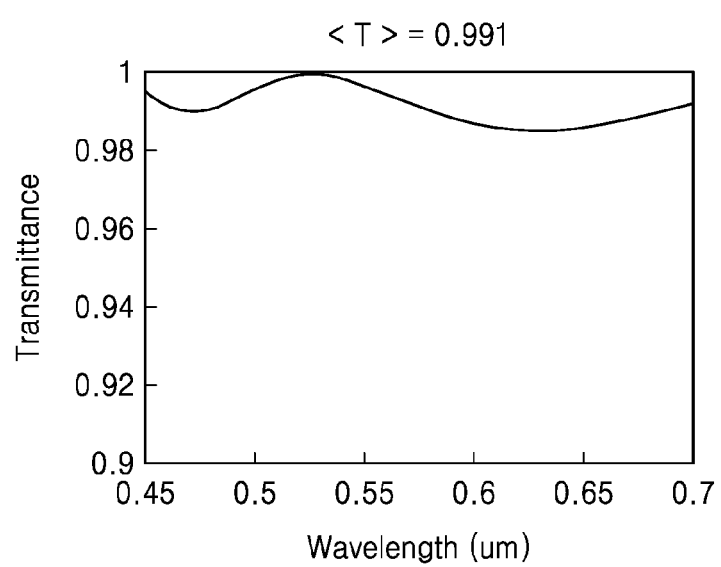
FIG. 13B is a graph illustrating a transmittance computational simulation result for FIG. 13A.

FIG. 13A is a cross-sectional view illustrating a structure of a meta-optical device according to an example embodiment and materials and shape dimensions used for computational simulation, and FIG. 13B is a graph illustrating a transmittance computational simulation result for FIG. 13A.

The meta-optical device according to the example embodiment of FIG. 13A includes a functional layer 40 having a symmetrical structure between the substrate SU and a first meta-structure layer MS. Average transmittance <T> in a wavelength band between 0.45 μm and 0.7 μm is about 0.991, which indicates higher transmittance than the transmittance of the related example.

The meta-optical device according to the related example of FIG. 12A is different from the meta-optical device according to the example embodiment of FIG. 13A in that the meta-optical device of FIG. 12A has no structure corresponding to the functional layer 40 of the meta-optical device according to the example embodiment of FIG. 13A. It can be seen that transmittance of a meta-optical device is increased by providing the functional layer 40 including a plurality of layers having a symmetrical structure.

Figure 14A:
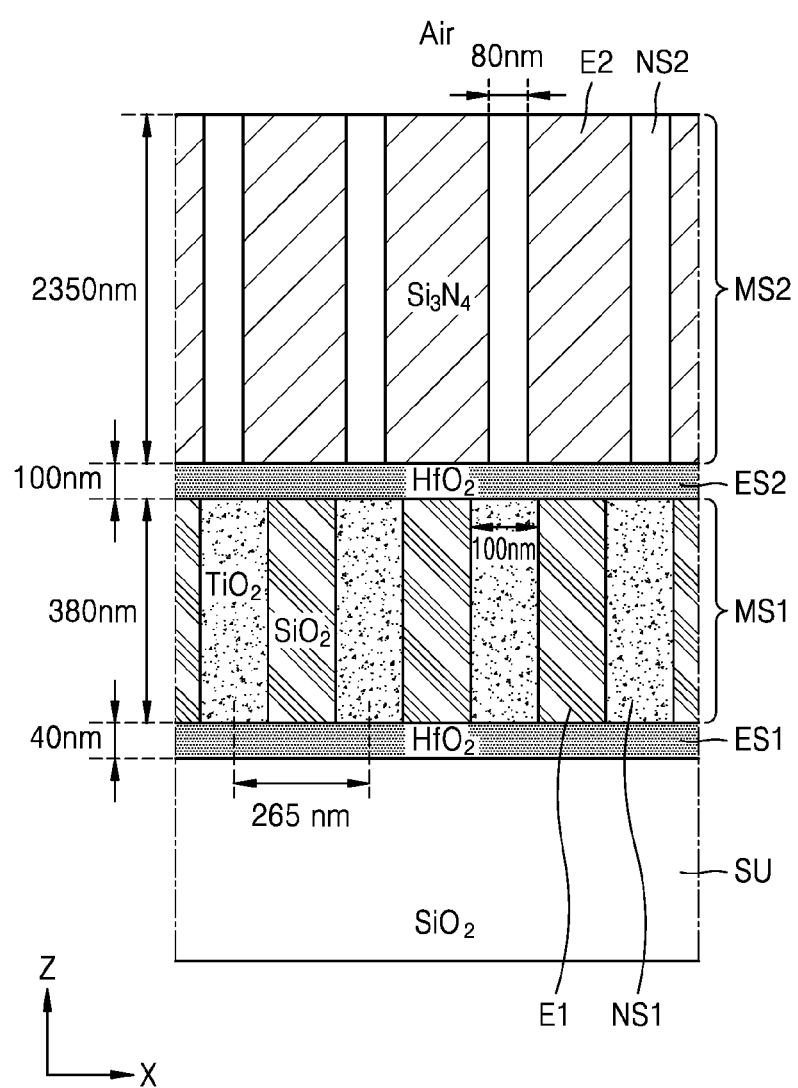
FIG. 14A is a cross-sectional view illustrating a structure of a meta-optical device according to another related example and materials and shape dimensions used for computational simulation.
Figure 14B:
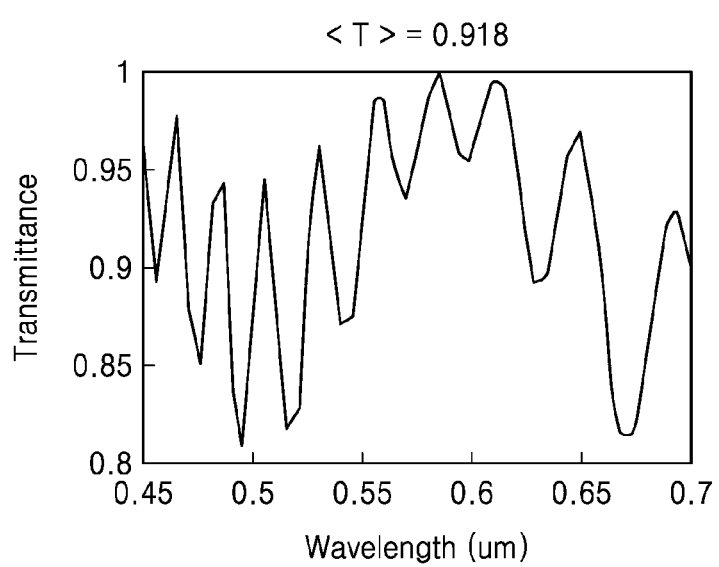
FIG. 14B is a graph illustrating a transmittance computational simulation result for FIG. 14A.

FIG. 14A is a cross-sectional view illustrating a structure of a meta-optical device according to another related example and materials and shape dimensions used for computational simulation, and FIG. 14B is a graph illustrating a transmittance computational simulation result for FIG. 14A.

The meta-optical device according to the related example of FIG. 14A includes a single etch stop layer ES1 between the substrate SU and a first meta-structure layer MS1, and a single etch stop layer ES2 between the first meta-structure layer MS1 and a second meta-structure layer MS2. Referring to FIG. 14B, average transmittance <T> in a wavelength band between 0.45 μm and 0.7 μm is about 0.918.

Figure 15A:
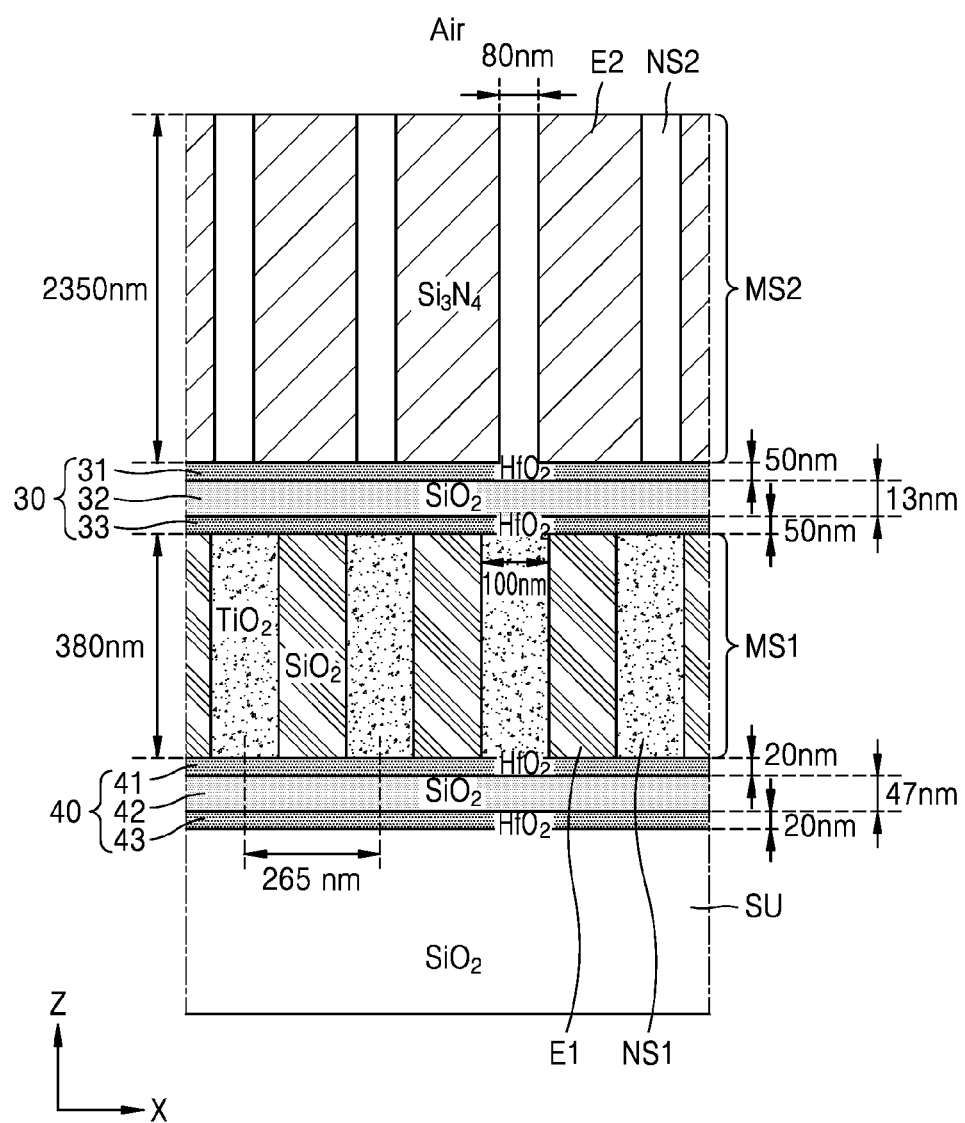
FIG. 15A is a cross-sectional view illustrating a structure of a meta-optical device according to another example embodiment and materials and shape dimensions used for computational simulation.
Figure 15B:
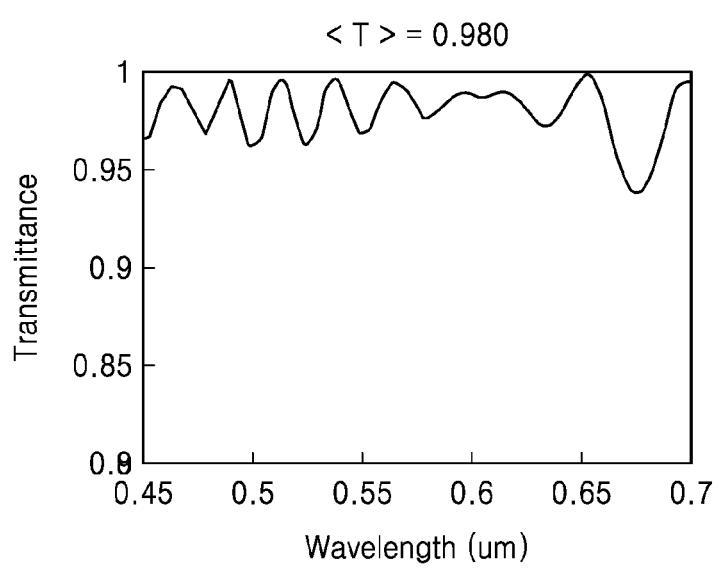
FIG. 15B is a graph illustrating a transmittance computational simulation result for FIG. 15A.

FIG. 15A is a cross-sectional view illustrating a structure of a meta-optical device according to an example embodiment and materials and shape dimensions used for computational simulation, and FIG. 15B is a graph illustrating a transmittance computational simulation result for FIG. 15A.

The meta-optical device according to the example embodiment of FIG. 15A includes a functional layer 40 having a symmetrical structure between the substrate SU and a first meta-structure layer MS1, and a functional layer 30 having a symmetrical structure is provided between the first meta-structure layer MS1 and a second meta-structure layer MS2. Referring to FIG. 15B, average transmittance <T> in a wavelength band between about 0.45 μm and about 0.7 μm is about 0.980, which indicates higher transmittance than transmittance of the related example.

The meta-optical device according to the related example of FIG. 14A is different from the meta-optical device according to the example embodiment of FIG. 15A in that the meta-optical device of FIG. 14A has no structure corresponding to the functional layers 30 and 40 of the meta-optical device according to the example embodiment of FIG. 15A. It can be seen that transmittance of a meta-optical device is increased by providing the two functional layers 30 and 40 including a plurality of layers having a symmetrical structure.

The meta-optical devices 1 to 11 described above form a refractive index distribution that implements a desired phase profile, thereby being applied to various optical devices, such as a lens, a beam deflector, and a beam shaper.

Figure 16A:
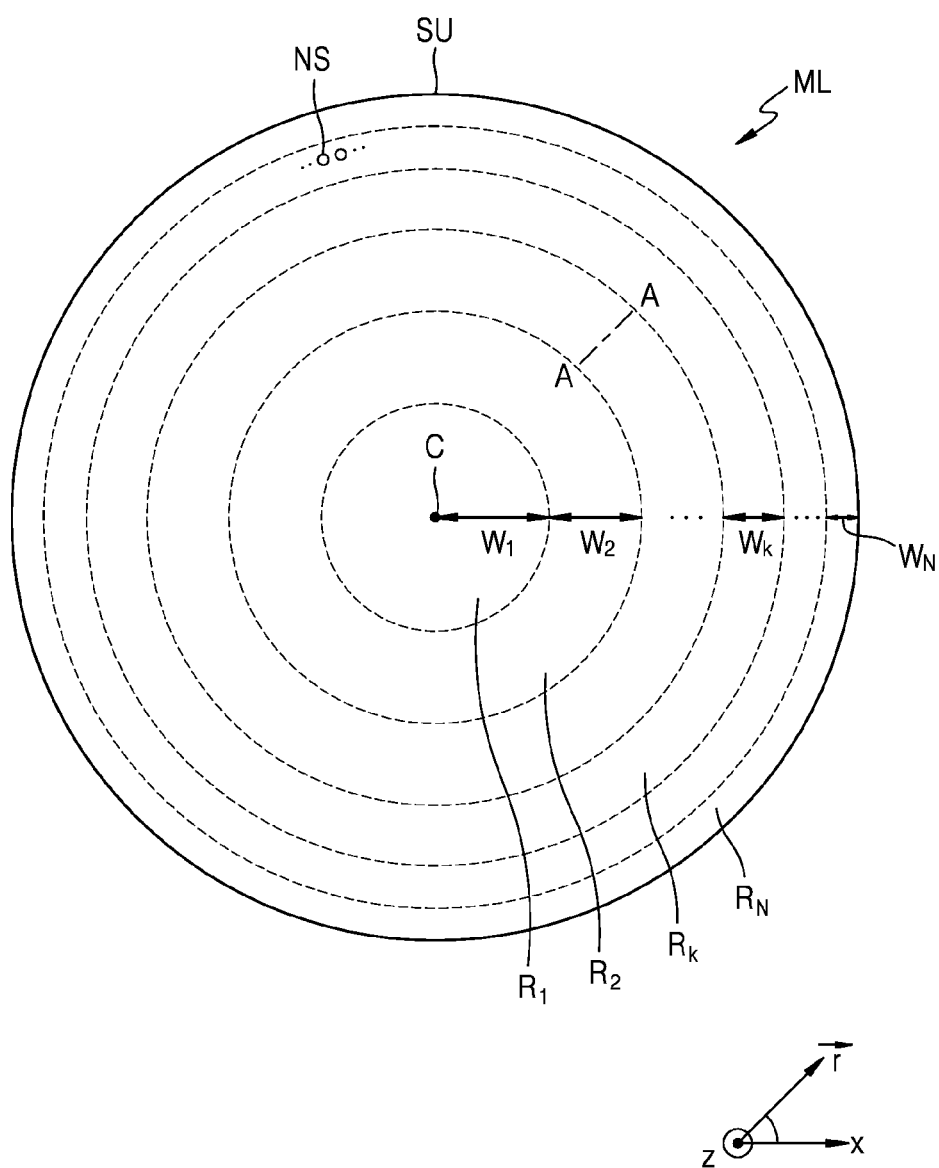
FIG. 16A is a plan view illustrating a region structure of a meta lens including a meta-optical device according to another example embodiment.
Figure 16B:
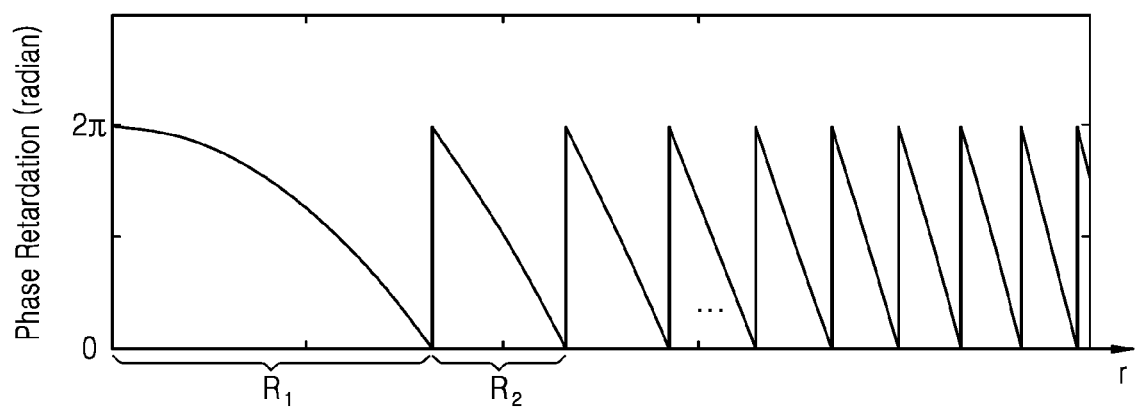
FIG. 16B exemplarily illustrates a phase profile implemented in each region of FIG. 16A.

FIG. 16A is a plan view illustrating a region structure of a meta lens including a meta-optical device according to an example embodiment, and FIG. 16B exemplarily illustrates a phase profile implemented in each region of FIG. 16A.

A meta lens ML includes a plurality of phase modulation regions $R_k$ having a circular central portion and a plurality of annular regions provided adjacent to and surrounding the circular central portion. A plurality of nanostructures NS are provided to serve as a lens and to represent a preset phase profile for each phase modulation region $R_k$. The plurality of phase modulation regions $R_k$ are arranged in a radial direction r from a center C of the meta lens ML, and widths of the plurality of phase modulation regions $R_k$ may be reduced as a distance from the center increases. The plurality of nanostructures NS may be on the substrate SU. For the sake of convenience, only a few nanostructures NS are illustrated in FIG. 16A, the embodiments are not limited thereto. The nanostructures NS may include a first nanostructure NS1 and a second nanostructure NS2 arranged in a plurality of layers separated in the Z direction, as illustrated in FIGS. 1 to 7 or may include the first nanostructures NS1 arranged in a single layer as illustrated in FIGS. 9 to 11. FIGS. 1 to 11 may be cross-sectional views taken along line AA of FIG. 16A.

Each of the plurality of phase modulation regions $R_k$ is a region representing a monotonous phase modulation pattern within a preset range. The plurality of phase modulation regions $R_k$ include a first region $R_1$, a second region $R_2$, ... , and an N-th region $R_N$, which are sequentially arranged in the radial direction r from the center C of a meta-optical device 100. As illustrated, the first region $R_1$ may be a circular region, and the second region $R_2$ to the N-th region $R_N$ may be circular regions. The first region $R_1$ to the N-th region $R_N$ represent a phase delay within a preset range, and a phase modulation range may be $2\pi$ as illustrated in FIG. 16B. However, this is only an example and is not limited thereto. A total number N of the phase modulation regions and widths $W_1, \ldots, W_k, \ldots, W_N$ of the phase modulation regions may be determined according to refractive power (a focal length) and a lens diameter.

FIGS. 16A and 16B illustrate that a meta-optical device is applied to a meta lens but may also be used as another optical device by adjusting a phase profile. For example, when a plurality of phase modulation regions have the same width and when phase modulation ranges within the phase modulation regions are the same, a beam deflector that deflects incident light at an angle determined by the widths and the phase modulation ranges may be implemented.

The meta-optical devices according to the example embodiments may each include functional layers having a complex function that facilitate a manufacturing process and prevent optical performance from being reduced, and thus, a desired phase profile may be well implemented.

The meta-optical devices according to the example embodiments may each form a refractive index distribution that implements a phase profile suitable for a desired optical performance and may represent desired optical performance well and may be used in various electronic devices.

For example, the meta-optical devices may each be used as a lens and may each be included in an imaging lens assembly that forms an optical image of an object. The meta-optical devices may each be used in an optical system constituting a light detection and ranging (LiDAR) or a three-dimensional sensor and may each be included in an illumination optical system facing an object or may each be included in a detection optical system that collects and senses light from an object.

Figure 17:
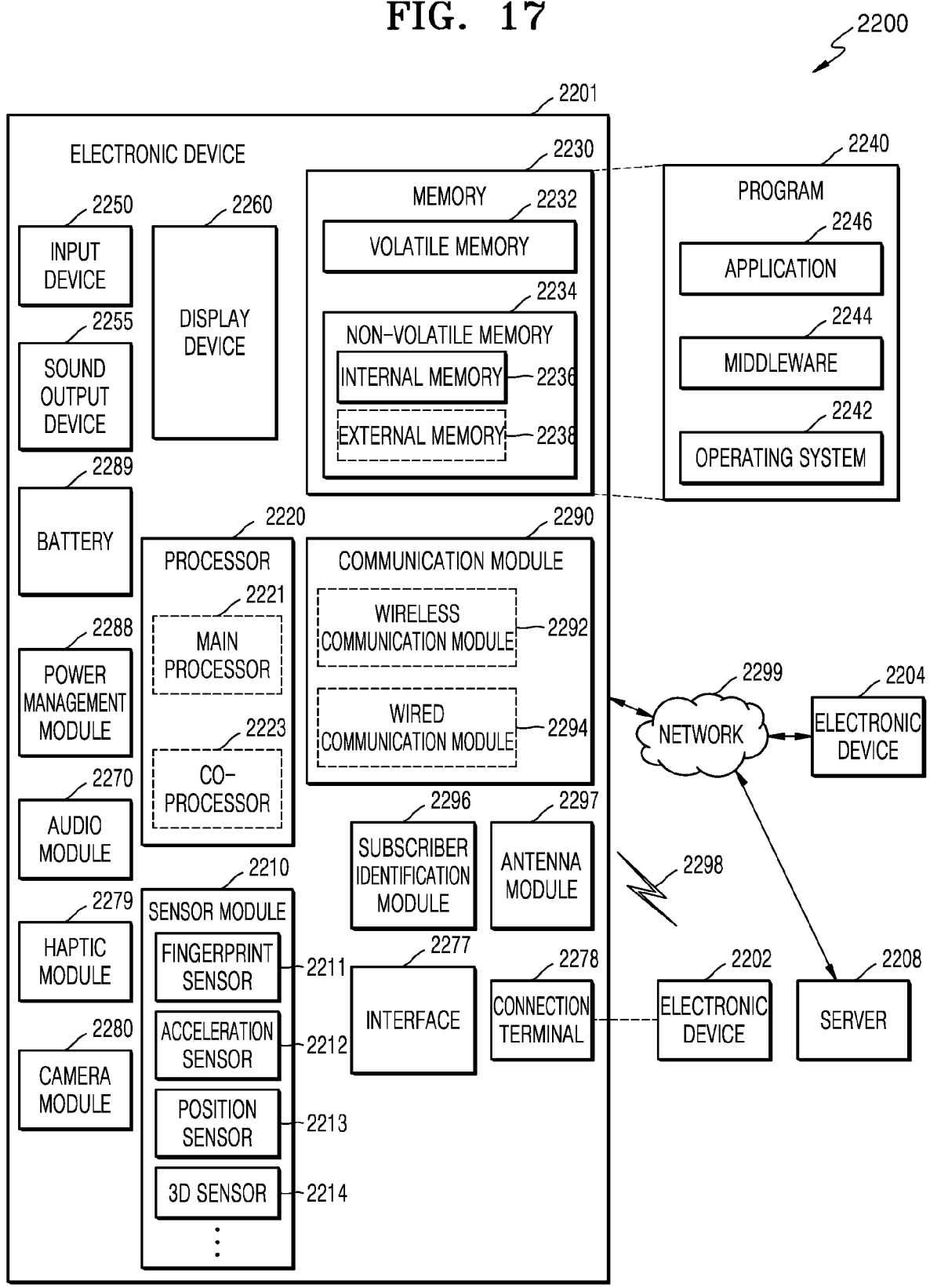
FIG. 17 is a block diagram illustrating a configuration of an electronic device according to an example embodiment.

FIG. 17 is a block diagram illustrating a configuration of an electronic device including a meta-optical device according to an example embodiment.

Referring to FIG. 17, in the network environment 2200, the electronic device 2201 may communicate with another electronic device 2202 through a first network 2298 (a short-range wireless communication network or so on) or may communicate with another electronic device 2204 and/or a server 2208 through a second network 2299 (a long-distance wireless communication network or so on). The electronic device 2201 may communicate with the electronic device 2204 through the server 2208. The electronic device 2201 may include a processor 2220, a memory 2230, an input device 2250, a sound output device 2255, a display device 2260, an audio module 2270, a sensor module 2276, an interface 2277, a haptic module 2279, a camera module 2280, a power management module 2288, a battery 2289, a communication module 2290, a subscriber identification module 2296, and/or an antenna module 2297. Some (the display device 2260 and so on) of the components may be omitted from the electronic device 2201, or other components may be added to the electronic device 2201. Some of the components may be integrated in one circuit. For example, a fingerprint sensor 2211, an iris sensor, an illuminance sensor, or so on of the sensor module 2276 may be embedded in the display device 2260 (a display or so on).

The processor 2220 may execute software (such as a program 2240) to control one or a plurality of other components (hardware, software components, and so on) of the electronic device 2201 connected to the processor 2220 and may perform various data processing or arithmetic. The processor 2220 stores commands and/or data received from other components (the sensor module 2276, the communication module 2290, and so on) in a volatile memory 2232 and process the commands and/or the data stored in the volatile memory 2232 and store resulting data in a non-volatile memory 2234 as part of data processing or arithmetic. The processor 2220 may include a main processor 2221 (a central processing unit, an application processor, or so on) and a co-processor 2223 (a graphics processing unit, an image signal processor, a sensor hub processor, a communication processor, or so on) that may be operated independently or together therewith. The co-processor 2223 may use less power than the main processor 2221 and may perform a specialized function.

The co-processor 2223 may control functions and/or states related to some components (the display device 2260, the sensor module 2276, the communication module 2290, and so on) of the electronic device 2201 on behalf of the main processor 2221 while the main processor 2221 is in an inactive state (sleep state), or together with the main processor 2221 while the main processor 2221 is in an active state (the application execution state). The co-processor 2223 (an image signal processor, a communication processor, or so on) may be implemented as part of another component (the camera module 2280, the communication module 2290, or so on) functionally related thereto.

The memory 2230 may store a variety of data required by components (the processor 2220, the sensor module 2276, and so on) of the electronic device 2201. Data may include, for example, input data and/or output data for software (such as the program 2240) and commands related thereto. The memory 2230 may include the volatile memory 2232 and/or the non-volatile memory 2234.

The program 2240 may be stored as software in the memory 2230 and may include an operating system 2242, middleware 2244, and/or an application 2246.

The input device 2250 may receive commands and/or data to be used in components (the processor 2220 and so on) of the electronic device 2201 from an exterior (a user or so on)

of the electronic device 2201. The input device 2250 may include a microphone, a mouse, a keyboard, and/or a digital pen (a stylus pen or so on).

The sound output device 2255 may output a sound signal to the exterior of the electronic device 2201. The sound output device 2255 may include a speaker and/or a receiver. The speaker may be used for general purposes such as multimedia playback or recording playback, and the receiver may be used to receive incoming calls. The receiver may be integrated into the speaker as part of the speaker or may be implemented as an independent separate device.

The display device 2260 may visually provide information to the exterior of the electronic device 2201. The display device 2260 may include a control circuit for controlling a display, a hologram device, or a projector and a corresponding device. The display device 2260 may include touch circuitry configured to sense a touch, and/or sensor circuitry configured to measure the intensity of force generated by the touch (a pressure sensor or so on).

The audio module 2270 may convert audio into an electrical signal or may convert an electrical signal into audio. The audio module 2270 may acquire audio through the input device 2250 or may output audio through a speaker and/or a headphone of the sound output device 2255, and/or another electronic device (the electronic device 2202) directly or wirelessly connected to the electronic device 2201.

The sensor module 2276 may detect an operation state (power, temperature, and so on) of the electronic device 2201 or an external environmental state (user state or so on) and may generate an electrical signal and/or a data value corresponding to the detected state. The sensor module 2210 may include a fingerprint sensor 2211, an acceleration sensor 2212, a position sensor 2213, a three-dimensional (3D) sensor 2214, and so on, and further include an iris sensor, a gyro sensor, an atmospheric pressure sensor, a magnetic sensor, a grip sensor, a proximity sensor, a color sensor, an infrared (IR) sensor, a biometric sensor, a temperature sensor, a humidity sensor, and/or an illuminance sensor.

The 3D sensor 2214 may emit light toto an object and analyze the light reflected from the object to detect a shape, movement, and so on of the object and may include the meta-optical devices 1 to 11 according to the example embodiments described above or modified structures thereof. The 3D sensor 2214 may include at least one meta-optical device that may be applied as a lens, a beam deflector, a beam shaper, or so on. An example structure of the 3D sensor 2214 is described below with reference to FIG. 19.

The interface 2277 may support one or more designated protocols that may be used for the electronic device 2201 to be connected directly or wirelessly to another electronic device (the electronic device 2202 or so on). The interface 2277 may include a high-definition multimedia interface (HDMI), a Universal Serial Bus (USB) interface, a secure digital (SD) card interface, and/or an audio interface.

A connection terminal 2278 may include a connector through which the electronic device 2201 may be physically connected to another electronic device (for example, the electronic device 2202). The connection terminal 2278 may include an HDMI connector, a USB connector, an SD card connector, and/or an audio connector (a headphone connector or so on).

The haptic module 2279 may convert an electrical signal into a mechanical stimulus (vibration, movement, or so on) or an electrical stimulus that a user may perceive through a tactile or motion sense. The haptic module 2279 may include a motor, a piezoelectric effect element, and/or an electrical stimulation element.

The camera module 2280 may capture a still image and a video. The camera module 2280 may include a lens assembly including one or more lenses, image sensors, image signal processors, and/or flashes. The lens assembly included in the camera module 2280 may collect light emitted from a subject to be imaged, and the lens assembly may include the meta-optical devices 1 to 11 according to the example embodiments described above or a structure modified therefrom. An example structure of the camera module 2280 is described below with reference to FIG. 21.

The power management module 2288 may manage power supplied to the electronic device 2201. The power management module 2288 may be implemented as part of a power management integrated circuit (PMIC).

The battery 2289 may supply power to configuration elements of the electronic device 2201. The battery 2289 may include a non-rechargeable primary cell, a rechargeable secondary cell, and/or a fuel cell.

The communication module 2290 may establish a direct (wired) communication channel and/or a wireless communication channel between the electronic device 2201 and another electronic device (the electronic device 2202, the electronic device 2204, the server 2208, or so on), and may support communication through the established communication channel. The communication module 2290 may operate independently of the processor 2220 (application processor or so on) and may include one or more communication processors that support direct communication and/or wireless communication. The communication module 2290 may include a wireless communication module 2292 (a cellular communication module, a short-range wireless communication module, a global navigation satellite system (GNSS) communication module, or so on) and/or a wired communication module 2294 (a Local Area Network (LAN) communication module, a power line communication module, or so on). A corresponding communication module among these communication modules may communicate with another electronic device through the first network 2298 (a short-range communication network such as Bluetooth, WiFi Direct, or infrared data association (IrDA)) or the second network 2299 (a telecommunication network such as a cellular network, the Internet, or a computer network (a LAN, a wide area network (WAN), or so on)). Various types of these communication modules may be integrated into one configuration element (a single chip or so on) or may be implemented as a plurality of separate configuration elements (multiple chips). The wireless communication module 2292 may check and authenticate the electronic device 2201 in a communication network such as the first network 2298 and/or the second network 2299 by using subscriber information (international mobile subscriber identifier (IMSI) and so on) stored in the subscriber identification module 2296.

The antenna module 2297 may transmit a signal and/or power to the outside (other electronic devices or so on) or may receive a signal from the outside. An antenna may include a radiator made of a conductive pattern formed on a substrate (a printed circuit board (PCB) or so on). The antenna module 2297 may include one or a plurality of antennas. When a plurality of antennas are included, an antenna suitable for a communication method used in a communication network such as the first network 2298 and/or the second network 2299 may be selected from among the plurality of antennas by the communication module 2290. A signal and/or power may be transmitted or received between the communication module 2290 and other electronic devices through the selected antenna. In addition to the antenna, other components (a radio frequency integrated circuit (RFIC) and so on) may be included as some of the antenna module 2297.

Some of the configuration elements may be connected to each other through a communication method (a bus, general purpose input and output (GPIO), serial peripheral interface (SPI), mobile industry processor interface (MIPI), or so on) between peripheral devices and may exchange signals (commands, data, and so on).

A command or data may be transmitted or received between the electronic device 2201 and the electronic device 2204, which is external, through the server 2208 connected to the second network 2299. The other electronic devices 2202 and 2204 may be the same devices as or different types of devices from the electronic device 2201. All or some of operations performed by the electronic device 2201 may be performed by one or more of the other electronic devices 2202, 2204, and 2208. For example, when the electronic device 2201 needs to perform a function or service, the electronic device may request one or more other electronic devices to perform the function or part or all of the service, instead of performing the function or service by itself. One or more other electronic devices that receive a request may perform an additional function or service related to the request and may transmit a performance result to the electronic device 2201. To this end, cloud computing technology, distributed computing technology, and/or client-server computing technology may be used.

Figure 18:
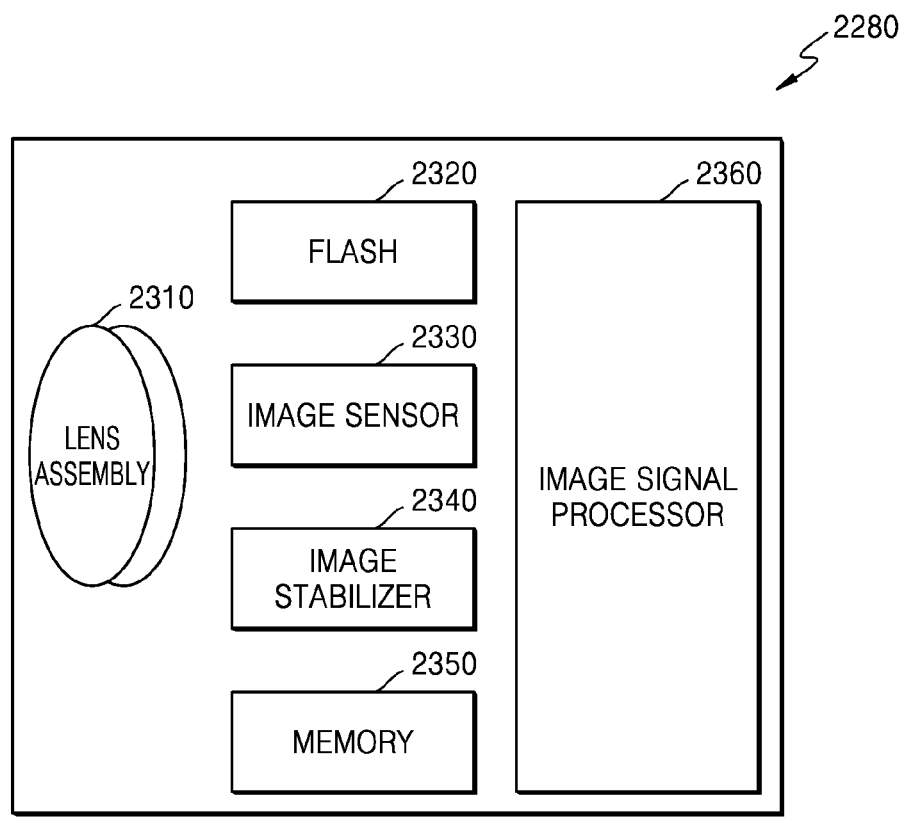
FIG. 18 is a block diagram illustrating a configuration of a camera module included in the electronic device of FIG. 17.

FIG. 18 is a block diagram illustrating a configuration of the camera module included in the electronic device of FIG. 17.

Referring to FIG. 18, the camera module 2280 includes a lens assembly 2310, a flash 2320, an image sensor 2330, an image stabilizer 2340, a memory 2350 such as a buffer memory, and/or an image signal processor 2360. The lens assembly 2310 may collect light emitted from an object which is an imaging target. The lens assembly 2310 may include at least one meta lens, and the meta lens included in the lens assembly 2310 may include at least one of the meta-optical devices 1 to 11 described above, a combination thereof, or a modified form thereof. The meta lens included in the lens assembly 2310 includes a functional layer that reduces reflection at an interface of a different effective refractive index, and thus, the meta lens may be increased lens performance. A plurality of meta lenses having different focal lengths, different effective diameters, and so on may be provided. The lens assembly 2310 may include both a refractive lens and a meta lens to have desired imaging performance. The lens assembly 2310 including the meta-optical device may have desired optical performance and a short optical length.

The camera module 2280 may further include an actuator. The actuator may drive positions of lens elements constituting the lens assembly 2310 and adjust a distance between the lens elements to perform zooming and/or autofocus (AF).

The camera module 2280 may include a plurality of lens assemblies 2310, and in this case, the camera module 2280 may serve as a dual camera, a 360-degree camera, or a spherical camera. Some of the plurality of lens assemblies 2310 may have the same lens property (an angle of view, a focal length, an auto focus, an F number, optical zoom, and so on) or may have different lens properties. The lens assembly 2310 may include a wide-angle lens or a telephoto lens.

The flash 2320 may emit light used to enhance light emitted or reflected from an object. The flash 2320 may include one or more light emitting diodes (LEDs) (a red-green-blue (RGB)) LED, a white LED, an infrared LED, an ultraviolet LED, and so on), and/or a Xenon Lamp. The flash 2320 may provide light of a plurality of different wavelengths and for example, a meta-optical device provided in the lens assembly 2310 may provide light of a narrowband wavelength representing lens performance without chromatic aberration. The image sensor 2330 may acquire an image corresponding to an object by converting light emitted or reflected from the object and transmitted through the lens assembly 2310 into an electrical signal. The image sensor 2330 may include one or more sensors selected from image sensors with different properties, such as an RGB sensor, a black and white (BW) sensor, an infrared (IR) sensor, and an ultraviolet (UV) sensor. Each of the sensors included in the image sensor 2330 may include a charged coupled device (CCD) sensor and/or a complementary metal oxide semiconductor (CMOS) sensor.

In response to movement of the camera module 2280 or the electronic device 2301 including the camera module 2280, the image stabilizer 2340 moves one or more lenses included in the lens assembly 2310 or the image sensor 2330 in a preset direction, or controls (adjusts a read-out timing or so on) operating characteristics of the image sensor 2330 to reduce a negative influence of the movement. The image stabilizer 2340 may detect movement of the camera module 2280 or the electronic device 2301 by using a gyro sensor or an acceleration sensor located inside or outside the camera module 2280. The image stabilizer 2340 may be implemented optically.

The memory 2350 may store some or all data of images acquired by the image sensor 2330 to perform a subsequent image processing operation. For example, when a plurality of images are acquired at a high speed, the acquired original data (Bayer-patterned data, high-resolution data, and so on) is stored in the memory 2350, only low-resolution images are displayed, and then original data of a selected (selected by a user or so on) image is transmitted to the image signal processor 2360. The memory 2350 may be integrated into the memory 2230 of the electronic device 2201 or may be configured as a separate memory that independently operates.

The image signal processor 2360 may perform image processing once or more for an image acquired by the image sensor 2330 or image data stored in the memory 2350. The image processing may include generation of a depth map, three-dimensional modeling, generation of a panorama, extraction of feature points, image synthesizing, and/or image compensation (noise reduction, resolution adjustment, brightness adjustment, and blurring), sharpening, softening, and so on. The image signal processor 2360 may control (controls exposure time, controls read-out timing, and so on) components (for example, the image sensor 2330 and so on) included in the camera module 2280. An image processed by the image signal processor 2360 may be stored back in the memory 2350 for further processing or may be provided to external components of the camera module 2280 (the memory 2230, the display device 2260, the electronic device 2202, the electronic device 2204, the server 2208, and so on). The image signal processor 2360 may be integrated into the processor 2220 or may be configured as a separate processor that operates independently of the processor 2220. When the image signal processor 2360 is configured as a processor independent of the processor 2220, an image processed by the image signal processor 2360 may be subjected to additional image processing by the processor 2220 and then displayed on the display device 2260.

The electronic device 2201 may include a plurality of camera modules 2280 with different properties or functions. In this case, one of the plurality of camera modules 2280 may include a wide-angle camera, and the others may include a telephoto camera. Similarly, one of the plurality of camera modules 2280 may include a front camera and the others may include a rear camera.

Figure 19:
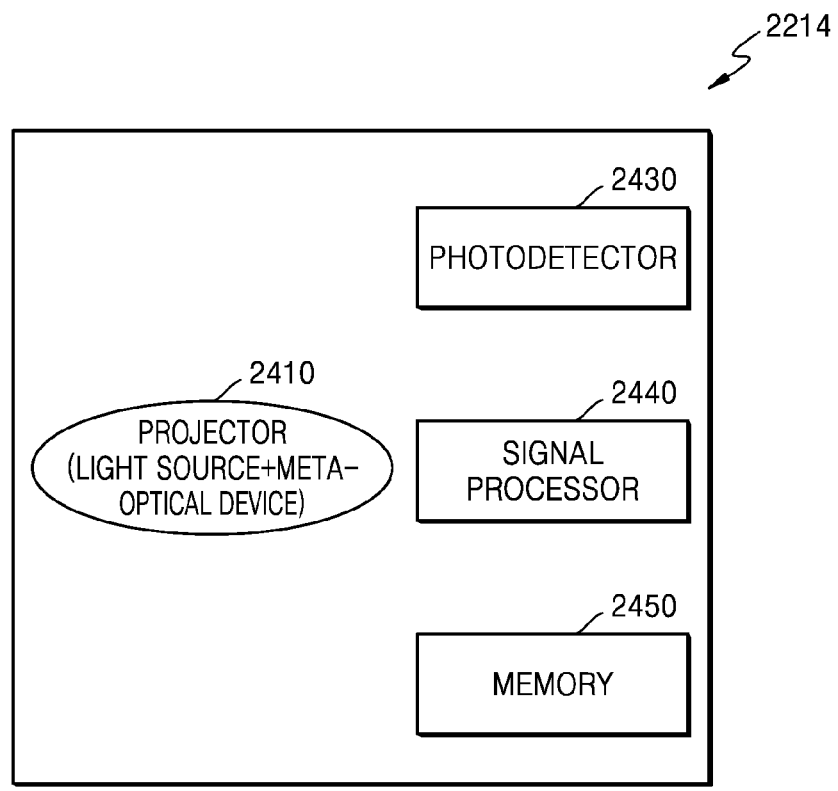
FIG. 19 is a block diagram illustrating a configuration of a three-dimensional sensor included in the electronic device of FIG. 17.

FIG. 19 is a block diagram illustrating a configuration of a 3D sensor included in the electronic device of FIG. 17.

The 3D sensor 2214 may detect a shape, movement, and so on of an object by emitting preset light to the object and receiving and analyzing the light reflected from the object. The 3D sensor 2214 may include a projector 2410, a photodetector 2430, a signal processor 2440, and a memory 2450. The projector 2410 may include a light source and a meta-optical device. The meta-optical device may include any one of the meta-optical devices 1 to 11 according to the example embodiments described above or a combination thereof or a modified structure thereof. The projector 2410 may include at least one meta-optical device that may serve as a lens, a beam deflector, or a beam shaper.

The projector 2410 may emit light to be used to analyze a shape or a position of an object. The projector 2410 may include a light source that generates and emits light with a small wavelength. The light source may include a laser diode (LD), a light emitting diode (LED), a super luminescent diode (SLD), or on the like that emits light of a wavelength band suitable for analyzing a position and a shape of an object, for example, light with an infrared band wavelength. The light source may include a tunable laser diode. The light source may generate and emit lights of different wavelength bands. The lights of different wavelength bands may each have a narrow bandwidth, for example, a bandwidth less than or equal to 10 nm or less than or equal to 5 nm. The light source may generate and emit pulse light or continuous light.

The meta-optical device provided in the projector 2410 may modulate the light emitted from a light source and transfers the modulated light to an object. When the meta-optical device is a beam deflector, the meta-optical device may deflect incident light in a preset direction to be directed toward an object. When the meta-optical device is a beam shaper, the meta-optical device modulates incident light such that the incident light has a distribution of a preset pattern. The meta-optical device may form structured light suitable for 3D shape analysis. The meta-optical device may be one or more lenses, and in this case, the meta-optical device may collect or collimate light emitted from a light source.

As described above, the meta-optical device includes a functional layer that may reduce reflection at interfaces having different effective refractive indices, and thus, desired light modulation performance may be well implemented.

The photodetector 2430 receives the reflected light of light applied to an object from the projector 2410. The photodetector 2430 may include an array of a plurality of sensors for detecting light or may include only one sensor. A meta-optical device may be provided in the photodetector 2430. The meta-optical device provided in the photodetector 2430 may be a lens that collect light with a sensor.

The signal processor 2440 may process a signal detected by the photodetector 2430 to analyze a shape of an object. The signal processor 2440 may analyze a 3D shape including a depth position of an object.

Calculation for measuring time of flight of light may be performed to analyze a 3D shape. Various calculation methods may be used to measure the time of flight of light. For example, in a direct time measurement method, a distance is calculated by emitting pulse light to an object and measuring time that light returns after being reflected from an object with a timer. In a correlation method, a distance is calculated by emitting pulse light to an object and measuring brightness of light reflected from the object. In a phase delay measurement method, a distance is calculated by emitting continuous wave light such as a sine wave to an object and detecting a phase difference of light reflected from the object.

When structure light is radiated to an object, a depth position of the object may be calculated by analyzing a change in pattern of the structure light reflected from the object, For example, a pattern of incident structure light with the pattern of the reflected structure light. Depth information of an object may be extracted by tracking a change in pattern for each coordinate of structure light reflected from the object, and 3D information on a shape and movement of the object may be extracted from the depth information.

The memory 2450 may store programs and other data necessary for calculation of the signal processor 2440.

A calculation result of the signal processor 2440, For example, information on a shape and a position of an object may be transmitted to another unit in the electronic device 2200 or to another electronic device. For example, the information may be used by the application 2246 stored in the memory 2230. Another electronic device to which the calculation result is transmitted may include a display device or a printer that outputs results. In addition, the electronic device may include an autonomous driving device such as an unmanned vehicle, an autonomous vehicle, a robot, and a drone, a smartphone, a smart watch, a mobile phone, a personal digital assistant (PDA), a laptop computer, a personal computer (PC), various wearable devices, other mobile or non-mobile computing devices, or Internet of Things devices but is not limited thereto.

Although the meta-optical devices described above and the electronic device including one of the meta-optical devices are described with reference to the example embodiments illustrated in the drawings, these are merely examples, and those skilled in the art may understand that various modifications and equivalent other implementations may be made therefrom. Therefore, the example embodiments have to be considered in an illustrative send rather than a restrictive sense. The scope of rights is indicated in the claims rather than the above description, and all differences within the scope of equivalents should be construed as being included in the scope of rights.

The meta-optical devices described above may each include a functional layer having a complex function that facilitates a manufacturing process and prevents reduction of optical performance, and thus, a desired phase profile may be well implemented.

The meta-optical devices described above may each be utilized as a lens, a beam deflector, a beam shaper, and so on and may be employed in various electronic devices including the lens, the beam deflector, and the beam shaper.

It should be understood that example embodiments described herein should be considered in a descriptive sense only and not for purposes of limitation. Descriptions of features or aspects within each example embodiment should typically be considered as available for other similar features or aspects in other embodiments. While example embodiments have been described with reference to the figures, it will be understood by those of ordinary skill in the art that various changes in form and details may be made therein without departing from the spirit and scope as defined by the following claims and their equivalents.

What is claimed is:

1. A meta-optical device comprising:
a substrate;
a first meta-structure layer provided on the substrate, the first meta-structure layer comprising a first nanostructure having a sub-wavelength shape dimension and a first peripheral material provided adjacent to the first nanostructure;
a second meta-structure layer provided on the first meta-structure layer, the second meta-structure layer comprising a second nanostructure having the sub-wavelength shape dimension and a second peripheral material provided adjacent to the second nanostructure;
a first functional layer provided between the first meta-structure layer and the second meta-structure layer, the first functional layer comprising a first-first layer having an etch rate that is lower than an etch rate of the second peripheral material, and a first-second layer having a refractive index that is different from a refractive index of the first-first layer; and
a second functional layer provided between the substrate and the first meta-structure layer, the second functional layer comprising a second-first layer having an etch rate lower than an etch rate of the first peripheral material, and a second-second layer having a refractive index different from a refractive index of the second-first layer.

2. The meta-optical device of claim 1, wherein an effective refractive index of the first meta-structure layer is n1, an effective refractive index of the second meta-structure layer is n2, one of the refractive index of the first-first layer and the refractive index of the first-second layer is greater than $(n1*n2)^{1/2}$, and the other one of the refractive index of the first-first layer and the refractive index of the first-second layer is less than $(n1*n2)^{1/2}$.

3. The meta-optical device of claim 1, wherein the first functional layer further comprises a first-third layer having a refractive index that is the same as the refractive index of the first-first layer and a thickness that is the same as a thickness the first-first layer, and
wherein the first-second layer is provided between the first-first layer and the first-third layer.

4. The meta-optical device of claim 1, wherein a refractive index of the substrate is ns, an effective refractive index of the first meta-structure layer is n1, one of the refractive index of the second-first layer and the refractive index of the second-second layer is greater than $(ns*n1)^{1/2}$, and the other one of the refractive index of the second-first layer and the refractive index of the second-second layer is less than $(ns*n1)^{1/2}$.

5. The meta-optical device of claim 1, wherein the second functional layer further includes a second-third layer having a refractive index that is the same as the refractive index of the second-first layer and a thickness that is the same as a thickness of the second-first layer, and
wherein the second-second layer is provided between the second-first layer and the second-third layer.

6. The meta-optical device of claim 1, further comprising an antireflective layer provided between the substrate and the first meta-structure layer and having an effective refractive index between a refractive index ns of the substrate and an effective refractive index of the first meta-structure layer.

7. The meta-optical device of claim 1, further comprising an antireflective layer provided on the second meta-structure layer and having an effective refractive index between an effective refractive index of the second meta-structure layer and 1.

8. The meta-optical device of claim 7, wherein the second nanostructure is provided as a hole adjacent to the second peripheral material.

9. The meta-optical device of claim 8, further comprising:
a protective layer provided on the second meta-structure layer,
wherein the antireflective layer is provided between the second meta-structure layer and the protective layer.

10. The meta-optical device of claim 9, wherein the hole forming the second nanostructure extends through the antireflective layer to an interface with the protective layer.

11. The meta-optical device of claim 9, wherein the antireflective layer comprises a layer formed of the same material as the protective layer and a layer formed of a material different from a material of the protective layer, and
wherein the layer formed of the material different from the material of the protective layer is in contact with the protective layer.

12. The meta-optical device of claim 1, wherein the second peripheral material comprises silicon nitride, and
wherein the first-first layer of the first functional layer comprises hafnium oxide.

13. The meta-optical device of claim 12, wherein the first-second layer of the first functional layer comprises silicon oxide.

14. The meta-optical device of claim 1, wherein a thickness of the first-first layer of the first functional layer is greater than or equal to 3 nm and less than or equal to 100 nm.

15. The meta-optical device of claim 1, wherein, when a central wavelength of an operating wavelength of the meta-optical device is $\lambda c$, a total thickness of the first functional layer is greater than or equal to $\lambda c/10$ and less than or equal to $\lambda c$.

16. An electronic device comprising:
a lens assembly comprising:
a meta-optical device comprising:
a substrate;
a first meta-structure layer provided on the substrate, the first meta-structure layer comprising a first nanostructure having a sub-wavelength shape dimension and a first peripheral material provided adjacent to the first nanostructure;
a second meta-structure layer provided on the first meta-structure layer, the second meta-structure layer comprising a second nanostructure having the sub-wavelength shape dimension and a second peripheral material provided adjacent to the second nanostructure;
a first functional layer provided between the first meta-structure layer and the second meta-structure layer, the first functional layer comprising a first layer having an etch rate that is lower than an etch rate of the second peripheral material, and a second layer having a refractive index that is different from a refractive index of the first layer; and
a second functional layer provided between the substrate and the first meta-structure layer, the second functional layer comprising a second-first layer having an etch rate lower than an etch rate of the first peripheral material, and a second-second layer having a refractive index different from a refractive index of the second-first layer; and an image sensor configured to convert an optical image, formed by the lens assembly, into an electrical signal.

17. A meta-optical device comprising:

a substrate;

a first meta-structure layer provided on the substrate, the first meta-structure layer comprising a first nanostructure having a sub-wavelength shape dimension and a first peripheral material provided adjacent to the first nanostructure;

a second meta-structure layer provided on the first meta-structure layer, the second meta-structure layer comprising a second nanostructure having the sub-wavelength shape dimension and a second peripheral material provided adjacent to the second nanostructure;

a first functional layer provided between the first meta-structure layer and the second meta-structure layer, the first functional layer comprising a first layer having an etch rate that is lower than an etch rate of the second peripheral material, and a second layer having a refractive index that is different from a refractive index of the first layer;

an antireflective layer provided between the substrate and the first meta-structure layer; and a second functional layer provided between the substrate and the first meta-structure layer, the second functional layer comprising a second-first layer having an etch rate lower than an etch rate of the first peripheral material, and a second-second layer having a refractive index different from a refractive index of the second-first layer.

* * * * *